United States Patent
Mills et al.

(10) Patent No.: US 11,447,330 B2
(45) Date of Patent: Sep. 20, 2022

(54) MACHINE AND METHODS FOR DISPENSING NUTRITIONAL SUPPLEMENTS AND MULTI-SERVING CARTRIDGE THEREFOR

(71) Applicant: Tespo IP, LLC, Plymouth, MI (US)

(72) Inventors: Ted Matthew Mills, Novi, MI (US); Jeffrey Thomas Linton, Ann Arbor, MI (US); Chase Ryan Linton, Ann Arbor, MI (US)

(73) Assignee: Tespo IP, LLC, Plymouth, MI (US)

( * ) Notice: Subject to any disclaimer, the term of this patent is extended or adjusted under 35 U.S.C. 154(b) by 0 days.

(21) Appl. No.: 17/002,103

(22) Filed: Aug. 25, 2020

(65) Prior Publication Data
US 2020/0385203 A1    Dec. 10, 2020

Related U.S. Application Data

(63) Continuation of application No. 16/363,122, filed on Mar. 25, 2019, now Pat. No. 10,759,594, which is a
(Continued)

(51) Int. Cl.
*B65D 85/00* (2006.01)
*B65D 85/804* (2006.01)
(Continued)

(52) U.S. Cl.
CPC ........ *B65D 85/8067* (2020.05); *A47J 31/401* (2013.01); *A61J 3/002* (2013.01);
(Continued)

(58) Field of Classification Search
CPC ........ A61J 7/0418; A61J 3/002; A61J 7/0076; A61J 7/0481; A61J 7/0046;
(Continued)

(56) References Cited

U.S. PATENT DOCUMENTS 3,340,789 A    9/1967 Simjian
3,340,790 A    9/1967 Simjian
(Continued)

FOREIGN PATENT DOCUMENTS

CA    2519159 C    5/2012
CN    1761604 B    6/2010
(Continued)

OTHER PUBLICATIONS

Singapore Search Report and Written Opinion for Application No. 10201804028P, dated Apr. 7, 2020, 9 pages.
(Continued)

*Primary Examiner* — Anshu Bhatia
(74) *Attorney, Agent, or Firm* — Brooks Kushman P.C.

(57) ABSTRACT

A granulated nutritional supplement dispensing machine extracts single-serving doses from a multi-serving supplements cartridge for delivery as a drinkable solution. A lead serving chamber is pierced so that its powered contents drain into a mixing cup together with a metered quantity of water from an integrated water tank. A vibrator unit assists drainage of the granulated materials from the lead serving chamber. The mixing cup is rotated at high speed to blend the water and supplements into a slurry. The supplements cartridge is indexed after (or before) use so that an unopened serving chamber is presented each time for extracting its supplements. This enables partially-used supplements cartridges to be used in the machine, as is conducive in multiple-user households. The supplements cartridge is configured with read-write data capability to indicate whether or not the contents of each serving chamber have been emptied.

15 Claims, 23 Drawing Sheets

Related U.S. Application Data continuation of application No. 15/034,316, filed as application No. PCT/US2014/064946 on Nov. 11, 2014, now Pat. No. 10,279,985.

(60) Provisional application No. 61/903,978, filed on Nov. 14, 2013.

(51) Int. Cl.

| | | |
|---|---|---|
| *B65D 83/04* | (2006.01) | |
| *A61J 7/00* | (2006.01) | |
| *A61J 7/04* | (2006.01) | |
| *A47J 31/40* | (2006.01) | |
| *B65D 83/06* | (2006.01) | |
| *A61J 3/00* | (2006.01) | |
| *B65D 25/04* | (2006.01) | |
| *B65D 25/28* | (2006.01) | |

(52) U.S. Cl.
CPC ........... *A61J 7/0076* (2013.01); *A61J 7/0418* (2015.05); *A61J 7/0481* (2013.01); *B65D 25/04* (2013.01); *B65D 25/28* (2013.01); *B65D 83/0463* (2013.01); *B65D 83/06* (2013.01); *A61J 7/0046* (2013.01)

(58) Field of Classification Search
CPC .... B65D 85/8043; B65D 25/04; B65D 25/28; B65D 83/0463; B65D 83/06; A47J 31/401
See application file for complete search history.

(56) References Cited

U.S. PATENT DOCUMENTS

| | | | |
|---|---|---|---|
| 3,638,830 A | 2/1972 | Belokin, Jr. | |
| 5,110,007 A | 5/1992 | Law et al. | |
| 5,159,581 A * | 10/1992 | Agans | A61J 7/0481 |
| | | | 206/538 |
| 5,762,199 A | 6/1998 | Aguilera | |
| 5,799,821 A | 9/1998 | Lambelet, Jr. et al. | |
| 5,853,101 A | 12/1998 | Weinstein | |
| 5,918,768 A | 7/1999 | Ford | |
| 6,126,010 A | 10/2000 | Kogen | |
| 6,173,117 B1 | 1/2001 | Clubb | |
| 6,330,850 B1 | 12/2001 | Rosse | |
| 6,360,650 B1 | 3/2002 | Mangiapane | |
| 6,364,155 B1 | 4/2002 | Wolfe | |
| 6,601,729 B1 | 8/2003 | Papp | |
| 6,669,022 B2 | 12/2003 | Donegan | |
| 6,729,226 B2 | 5/2004 | Mangiapane | |
| 6,805,258 B2 | 10/2004 | Cross | |
| 6,874,652 B2 | 4/2005 | Christensen et al. | |
| 7,363,852 B2 | 4/2008 | Mangiapane | |
| 7,377,277 B2 | 5/2008 | Hickey et al. | |
| 8,360,279 B1 | 1/2013 | Giles | |
| 8,475,856 B2 | 7/2013 | Sheehan | |
| 8,556,127 B2 | 10/2013 | Olson et al. | |
| 8,565,917 B2 | 10/2013 | Crisp | |
| 8,579,166 B2 | 11/2013 | Bernhardsgruetter et al. | |
| 8,584,901 B2 | 11/2013 | Dooley et al. | |
| 8,651,336 B2 | 2/2014 | Gadini et al. | |
| D733,454 S | 7/2015 | Von Heifner et al. | |
| 2002/0048621 A1 | 4/2002 | Boyd et al. | |
| 2002/0166791 A1 | 11/2002 | Donegan | |
| 2004/0188313 A1 | 9/2004 | Tedham | |
| 2004/0197444 A1 | 10/2004 | Halliday et al. | |
| 2005/0109659 A1 * | 5/2005 | Hickey | A61M 15/001 |
| | | | 206/538 |
| 2005/0236420 A1 | 10/2005 | Jowett et al. | |
| 2005/0034604 A1 | 12/2005 | Halliday et al. | |
| 2006/0150821 A1 | 7/2006 | Paul et al. | |
| 2009/0078606 A1 | 3/2009 | Conley et al. | |
| 2010/0024658 A1 | 2/2010 | Jacobs et al. | |
| 2010/0282781 A1 | 11/2010 | Kinzie et al. | |
| 2011/0049180 A1 | 3/2011 | Carpenter et al. | |
| 2011/0163127 A1 | 7/2011 | DiBella-Lenaway | |
| 2011/0210140 A1 | 9/2011 | Girard et al. | |
| 2012/0248147 A1 | 10/2012 | Krom et al. | |
| 2013/0032611 A1 | 2/2013 | Dooley et al. | |
| 2013/0032612 A1 | 2/2013 | Armstrong et al. | |
| 2013/0035785 A1 * | 2/2013 | MacVittie | A61J 7/0076 |
| | | | 700/231 |
| 2014/0061238 A1 | 3/2014 | Olson et al. | |
| 2014/0130678 A1 | 5/2014 | Frydman | |
| 2014/0263391 A1 | 9/2014 | Akdogan et al. | |
| 2014/0263423 A1 | 9/2014 | Akdogan et al. | |
| 2014/0263425 A1 | 9/2014 | Akdogan et al. | |
| 2014/0267719 A1 | 9/2014 | Akdogan et al. | |
| 2014/0277707 A1 | 9/2014 | Akdogan et al. | |
| 2014/0277710 A1 | 9/2014 | Akdogan et al. | |
| 2014/0278508 A1 | 9/2014 | Akdogan et al. | |
| 2016/0039553 A1 | 2/2016 | Akdogan et al. | |
| 2016/0039621 A1 | 2/2016 | Akdogan et al. | |
| 2016/0042151 A1 | 2/2016 | Akdogan et al. | |
| 2016/0280454 A1 | 9/2016 | Mills et al. | |

FOREIGN PATENT DOCUMENTS

| | | |
|---|---|---|
| CN | 102112026 A | 6/2011 |
| CN | 1997585 B | 11/2013 |
| EP | 2345351 A1 | 7/2011 |
| GB | 2402324 A | 12/2004 |
| JP | H0858858 A | 3/1996 |
| JP | 2001206463 A | 7/2001 |
| JP | 2002362652 A | 12/2002 |
| JP | 2004507322 A | 3/2004 |
| JP | 2006230842 A | 9/2006 |
| JP | 2012522697 A | 9/2012 |
| WO | 03080469 A1 | 10/2003 |
| WO | 2004069688 A2 | 8/2004 |
| WO | 2004084687 A1 | 10/2004 |
| WO | 2010131407 A1 | 11/2012 |
| WO | 2013139548 A1 | 9/2013 |
| WO | 2013158712 A1 | 10/2013 |

OTHER PUBLICATIONS

Australian Examination Report for Application No. 2019204094, dated May 11, 2020, 5 pages.
European Search Report for Application No. 21151040.9, dated May 14, 2021, 7 pages.
Japanese Office Action and English translation for Application No. 2019-173731, dated Dec. 8, 2020, 8 pages.
Korean Office Action for Application No. 10-2016-7015001, dated Jun. 17, 2021, 3 pages.

* cited by examiner

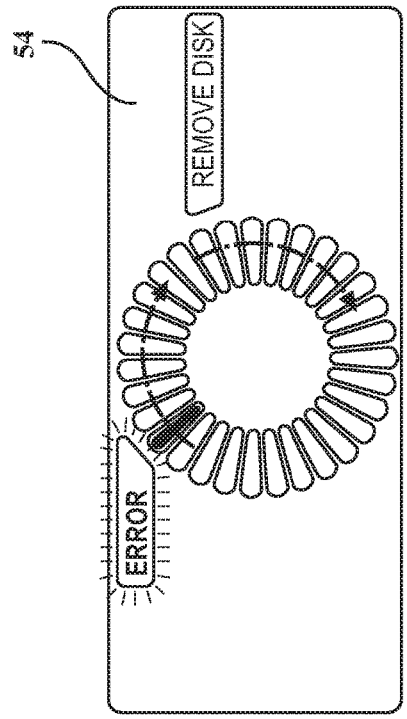
FIG. 16C
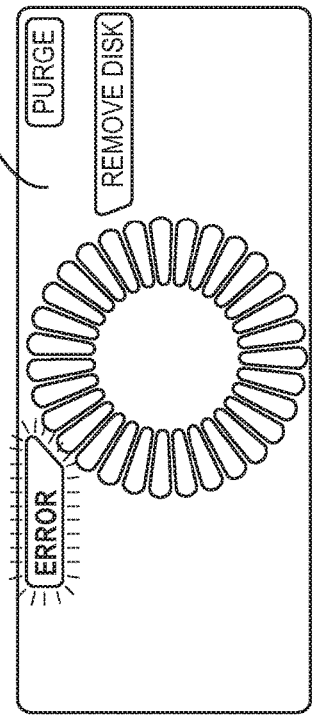
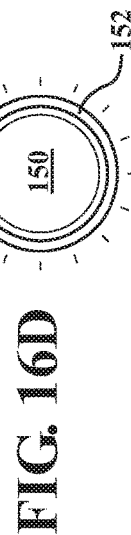
FIG. 16D
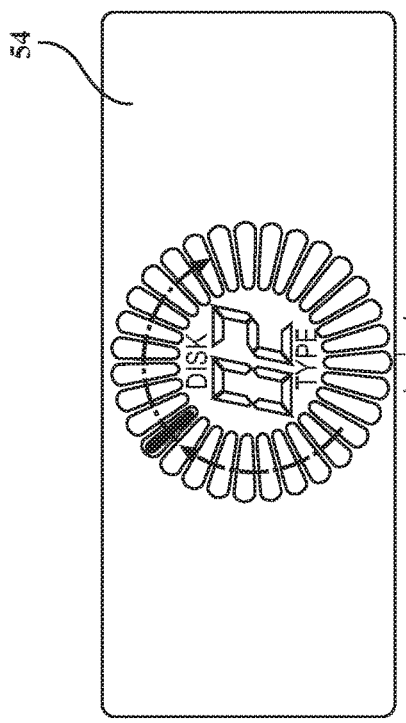
FIG. 16A
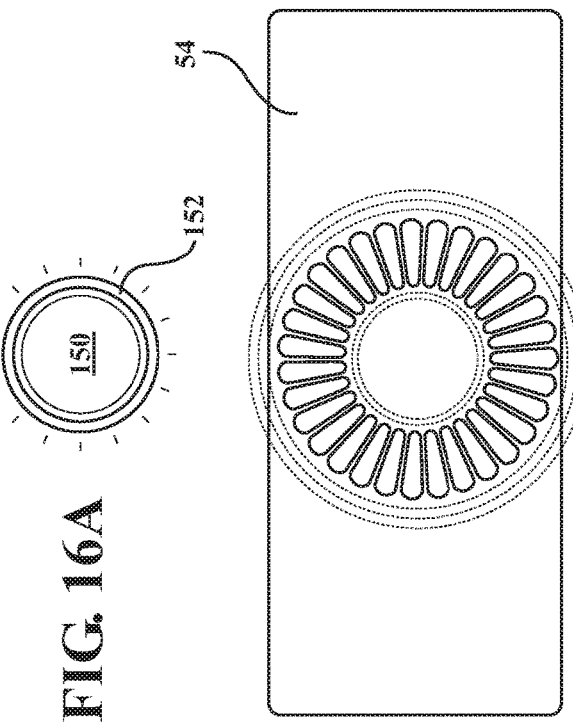
FIG. 16B

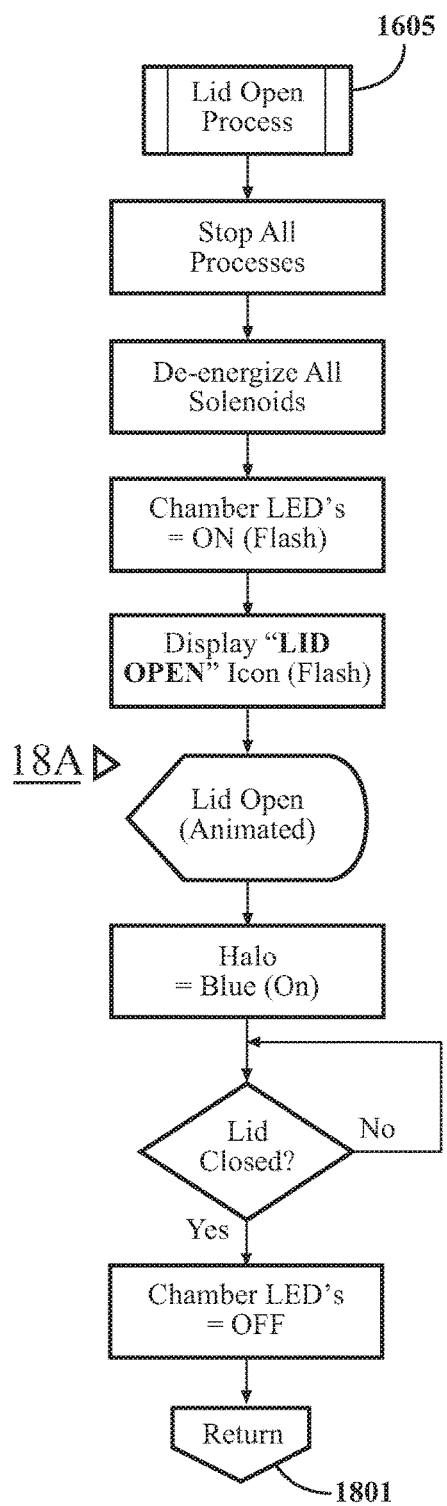
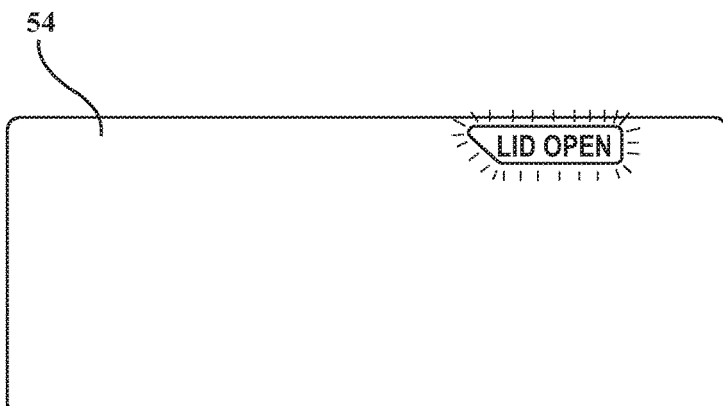
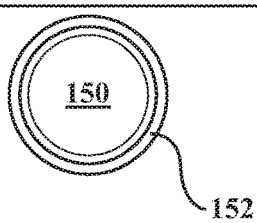
FIG. 18A
FIG. 18

MACHINE AND METHODS FOR DISPENSING NUTRITIONAL SUPPLEMENTS AND MULTI-SERVING CARTRIDGE THEREFOR

CROSS-REFERENCE TO RELATED APPLICATIONS

This application is a continuation of U.S. application Ser. No. 16/363,122 filed Mar. 25, 2019, now U.S. Pat. No. 10,759,594, which is a continuation of U.S. Ser. No. 15/034,316 filed May 4, 2016, now U.S. Pat. No. 10,279,985, which is a US National Phase of PCT/US14/64946 filed Nov. 11, 2014, which claims priority to Provisional Patent Application No. 61/903,978 filed Nov. 14, 2013, the disclosures of which are hereby incorporated in their entirety by reference herein.

TECHNICAL FIELD

The invention relates generally to a method and delivery system for mixing powder-form dietary supplements and/or pharmaceuticals in measured doses with a suitable liquid to be consumed by drinking, and a multi-serving cartridge therefor.

BACKGROUND

A dietary supplement provides a person (or animal) with nutrients that may otherwise not normally consume in sufficient quantities. As used herein, the term dietary supplement and nutritional supplement are used more or less interchangeably and are intended to broadly define any and all types of vitamins, minerals, fibers, fatty acids, proteins, amino acids, herbal medicines, bodybuilding supplements, pharmaceuticals, therapeutics, medicines, drugs, treatments and any other like substance that is ingested for health purposes. It has been reported that more than half of the U.S. adult population regularly consume nonpharmaceutical dietary supplements, with the most common type being multi-vitamins. When considering also medicinal forms of dietary supplements, the number is substantially higher.

The traditional market for the manufacture and intake of dietary supplements are most often produced in a tablet or capsule form. Pills and capsules are difficult for many people to swallow and/or digest. Manufacturing of such dietary supplements in pill/tablet form requires the use of fillers and/or binding agents in order to produce a tablet that is solid and has an acceptable shelf life. Manufactured tablets or capsules are often large which tends to limit the amount of active ingredient content. Many consumers will avoid or are unable to take large pills, which leaves the consumer with few alternatives.

The dietary supplement industry has tried to address this issue by providing rapidly dissolving tablets and chewable tablets. Dietary supplements in dissolving tablet or chewable form have many of the same negative attributes of capsules and tablets, such as they typically contain fillers, sugars or binding agents which limit the amount of active ingredient content. The excessive use of fillers and binding agents resists digestion in the human (or animal) body; numerous studies have concluded that pill-form vitamins with even moderate amounts of fillers and/or binding agents can pass through the human digestive system with only a fraction of the active ingredients having been absorbed in the body. Gel-type tablets have been developed to help address the absorption issues, but tend to be even larger and more difficult to swallow especially for those who suffer with esophageal dysphagia.

Swallowing large pills, and even small pills for some, are difficult for many people. Those who are elderly, those with throat conditions, children, and others experience the most discomfort ingesting pill/tablet form dietary supplements. And in addition to humans, many conscientious pet owners would like to provide dietary supplements to their dog or cat or horse or other valued animal. Some pets will resist taking a dietary supplement in pill-form, regardless of pill size. And some animals have a more rapid digestive through-put than humans, making pills with substantial amounts of fillers and binding agents even less effective by passing through the animal's body before a sufficient load of the active ingredients having been absorbed.

Another issue with prior art dietary supplements relates to correct dosing. As many dietary supplements are sold "over-the-counter", many consumers will form a subconscious understanding that the dietary supplements do not need to be taken with the same high level of care as they might otherwise give to prescription medicines. As an effect of this subconscious belief, the average consumer may not be as concerned about missing a daily dose, or perhaps at the other extreme of taking two doses when only one is recommended. For example, a busy or distracted person might not recall if they had taken their vitamin pill that day. This person might think "No big deal, I will take one tomorrow". Or they might think, "No big deal, I will take another pill just to be safe". In both cases, the person runs the risk of either over-dosing or underdosing their intake of the dietary supplement. Of course, pills boxes and the like have been developed to help organize pill consumption for people, but such are normally used for prescription medicines only and require a high degree of discipline to use regularly.

There is therefore a need in the art for an improved dietary supplement system that reduces the use of fillers and binding agents, and that reduces the likelihood of over-dosing and under-dosing, and that is easily swallowed, and that is rapidly digested.

SUMMARY

According to a first aspect of this invention, a granulated nutritional supplement dispensing machine is provided. The machine has a housing in which is proved a cartridge bay. A supplement extraction mechanism is associated with the cartridge bay. A water tank is disposed in the housing and configured to hold water at a water level. The water tank has an outlet. A conduit extends from the outlet to terminate at an exit end. A flow control valve is operatively associated with the conduit, and can be selectively actuated between open and closed positions to regulate the flow of water from the exit end of the conduit. A fluid level monitor is operatively associated with the water tank for measuring the water level in the water tank. A computer control system operatively interconnects the fluid level monitor and the flow control valve, and includes a non-transitory computer readable medium coded with instructions and executed by a processor to manipulate the flow control valve between its open and closed positions in direct response to the measured water level in the water tank. The computer control system enables a precise delivery of liquid to be mixed with a granulated or powdered form of nutritional supplement regardless of the water level in the tank.

According to a second aspect of this invention, the granulated nutritional supplement dispensing machine includes a generally annular supplements cartridge centered about a central axis. A housing of the machine includes a cartridge bay configured to receive the cartridge for rotation about the central axis. A supplement extraction mechanism is associated with the cartridge bay. The central axis is oriented at an acute angle relative to horizontal. By supporting the supplements cartridge at an angle within the housing, a user can more conveniently interact with the machine. Furthermore, in some embodiments the supplements cartridge is angled to better position a lead serving chamber thereof to be emptied into the mixing cup.

According to a third aspect of this invention, the granulated nutritional supplement dispensing machine includes a housing having a cartridge bay. A supplement extraction mechanism is associated with the cartridge bay, and there is also a cup bay formed in the housing. The cup bay is disposed below the cartridge bay, and a mixing cup is configured to rest in the cup bay. A cup drive system is disposed in the cup bay of the housing. The cup drive system includes a rotary platen that is rotatable about a mixing axis. The rotary platen is inclined backwardly into the cup bay with the mixing axis skewed at an acute rearward angle relative to horizontal. By setting the rotary platen at a rearwardly inclined angle, the mixing cup is angled away from the user to protect the user from spillage during a rotary mix cycle. Furthermore, the angled rotational configuration of the mixing cup enhances the process of mixing water and powdered nutritional supplements into solution.

According to a fourth aspect of this invention, the granulated nutritional supplement dispensing machine includes a generally annular supplements cartridge that is centered about a central axis. The supplements cartridge includes a plurality of serving chambers. A volume of granulated nutritional supplement is disposed in each serving chamber. A housing for the machine includes a cartridge bay that is configured to receive the supplements cartridge for rotation about its central axis. A supplement extraction mechanism is associated with the cartridge bay, and is operative to open the serving chambers one-at-a-time and then empty the granulated nutritional supplement contents therefrom. A cartridge drive mechanism rotates the supplements cartridge about the central axis within the cartridge bay. And a computer control system is operatively connected to the cartridge drive mechanism. The computer control system includes a nontransitory computer readable medium coded with instructions and executed by a processor to rotationally index the supplements cartridge in the cartridge bay until an unopened serving chamber is located directly adjacent the supplement extraction mechanism. Accordingly, the computer control system, working through the cartridge drive mechanism, aligns the supplements cartridge so than an available, i.e., unopened, serving chamber is positioned in a lead location so that the volume of granulated nutritional supplement contained in the unopened or lead serving chamber can be emptied by the supplement extraction mechanism. Through this feature, a user can install a partially-used supplements cartridge into the cartridge bay of the machine. The computer control system causes the cartridge drive mechanism to rotationally index the supplements cartridge so than an unused serving chamber is placed in a lead position ready to be opened by the supplement extraction mechanism.

According to a fifth aspect of this invention, a multi-serving cartridge assembly for granulated nutritional supplements is provided. The cartridge assembly comprises a generally annular frame centered about a central axis. The frame includes a plurality of serving chambers. A volume of granulated nutritional supplement (as broadly defined herein) is sealed in each serving chamber. Furthermore, each serving chamber includes a fracturable element that is configured to be forcefully ruptured in order to extract the granulated nutritional supplement therefrom. The supplements cartridge is provided with a plurality of marker zones spaced apart from the serving chambers. One marker zone is associated with each serving chamber. The marker zones are configured to be physically altered or mutilated concurrently with the forceful rupturing of the fracturable element. The marker zones enable the supplements cartridge with a practical form of read-write data capability, in that the condition—altered vs. unaltered—of the marker zone can be used to indicate whether or not the contents of each serving chamber have been emptied. Once a serving chamber has been emptied, it is no longer available for use even though other serving chambers remain available for use. By spacing the marker zones a distance from their respective serving chambers, the exercise of assessing which serving chambers have been used and which remain available for use can be conducted in a remote region that is less susceptible to residual dust that might be expelled from empty serving chambers. As some types of automated devices for assessing the condition of the marker zones could be sensitive to residual dust from granulated nutritional supplements, this invention provides a more robust cartridge assembly.

According to a sixth aspect of this invention, a method for dispensing nutritional supplements from a rotary cartridge is provided. A supplements cartridge is supported in the cartridge bay of a dispensing machine for rotation. The supplements cartridge has a plurality of sealed serving chambers. A volume of granulated nutritional supplement is stored in each serving chamber. The serving chambers each include a fracturable element that is configured to be forcefully ruptured in order to open it and then remove the contents sealed inside. As the supplements cartridge is rotated in the cartridge bay, the supplements cartridge is initially surveyed to determine the number and/or location of previously unruptured, i.e., unopened, serving chambers in the plurality of serving chambers.

According to a seventh aspect of this invention, a method for filling a multi-serving supplements cartridge with granulated nutritional supplements is provided. The method includes the step of providing a generally annual supplements cartridge having a central axis. The supplements cartridge includes a plurality of sealed serving chambers arranged in an annular array about the central axis. Each serving chamber has a radial centerline that intersects the central axis. A locator feature is formed into the supplements cartridge in relation to the respective centerline of one of the serving chambers. As part of the filling operation, the supplements cartridge is loaded into a filling station, where its locator feature is registered with a corresponding member of the filling station. Then each serving chamber is filled with a volume of the granulated nutritional supplement. The serving chambers are covered with a punctureable membrane, upon which at least one starter queue indicia has been fixed or applied. The starter queue indicia is carefully aligned relative to the alignment pin. The starter queue provides, in effect, a positioning tool for aligning a serving chamber with an automated opening/dispensing device. By aligning the started queue to the centerline of one serving chamber, the automated opening/dispensing device will be lined-up to make a successful, on-target approach. This starter queue feature may, in some embodiments, be particularly useful for first time use of a new, i.e., previously unopened, supplements cartridge.

The present invention overcomes many of the inadequacies in the prior art by providing methods and delivery systems for mixing powder-form dietary supplements (as broadly defined herein) in measured doses with a suitable liquid, e.g., water, to be consumed by drinking, as well as an improved multi-serving cartridge and methods for filling a multi-serving cartridge. The various forms and expressions of the present invention yield an improved dietary supplement system that reduces the use of fillers and binding agents commonly found in pill-form systems, reduces the likelihood of user over-dosing and under-dosing, that can be easily swallowed, and whose nutritional supplements are rapidly digested and/or absorbed by the user.

BRIEF DESCRIPTION OF THE DRAWINGS

These and other features and advantages of the present invention will become more readily appreciated when considered in connection with the following detailed description and appended drawings, wherein:

FIG. 16A is a view of an information display screen/user interface as it might appears at location 16A in the flow diagram of FIG. 16;

FIG. 16B is a view of the information display screen/user interface as it might appears at location 16B in the flow diagram of FIG. 16;

FIG. 16C is a view of the information display screen/user interface as it might appears at location 16C in the flow diagram of FIG. 16;

FIG. 16D is a view of the information display screen/user interface as it might appears at location 16D in the flow diagram of FIG. 16;

FIG. 18 is a simplified flow diagram describing a "Lid Open" sub-routine according to one exemplary embodiment;

FIG. 18A is a view of the information display screen/user interface as it might appears at location 18A in the flow diagram of FIG. 18;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
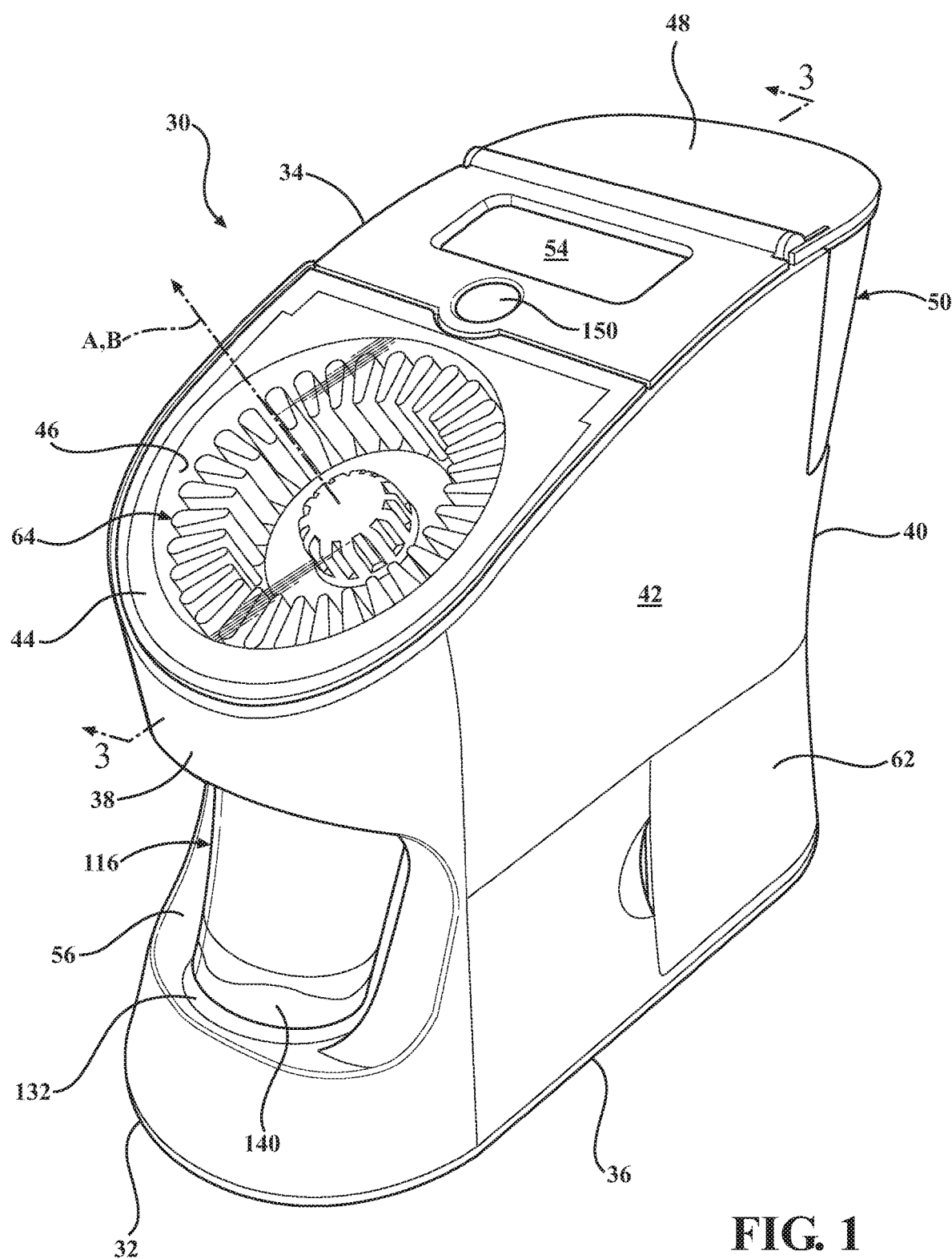
FIG. 1 is a perspective view of a machine and methods for dispensing nutritional supplements according to one exemplary embodiment of the present invention.

Referring to the figures, wherein like numerals indicate like or corresponding parts throughout the several views, a granulated nutritional supplement and/or pharmaceutical dispensing machine is generally shown at 30. The dispensing machine 30 may take many different forms, but is illustrated throughout the figures as an exemplary countertop appliance. The dispensing machine 30 includes a housing 32, which again can take many different shapes and forms. The housing 32 shown in FIG. 1 is sleek and provides a protective enclosure for many internal components that will be described in the following paragraphs. The housing 32 may be considered to include a top 34 and a bottom 36 and a front 38 and a back 40 and left/right sides 42. In the depicted example, the bottom 36 is configured to rest upon a horizontal support surface, such as a table or counter. In alternative examples, the dispensing machine 30 could be attached to a wall or door, or suspended underneath some kind of supporting structure like a shelf or a wall cabinet, or built into another appliance like a refrigerator or the like. Many other options are available to house the dispensing machine 30 for convenient access by a user.

The housing 32 includes a loading door 44 which, in the illustrated examples, is located on the top 34 of the unit adjacent the front 38 maximum ease of access. The loading door 44 is preferably transparent, or at least partially transparent, so that what lies underneath is visible from a distance. The loading door 44 may be hingedly connected to the housing top 34, or attached by sliding mechanism or even omitted altogether. In the illustrated embodiment, the hinge mechanism is somewhat configured like that of an automobile truck lid, i.e., with U-shaped hinge arms (visible in FIG. 2), to permit full unobstructed access underneath. A cartridge bay 46 is formed in the housing 32 below the loading door 44. The cartridge bay 46 is perhaps best shown in FIG. 2 comprising a generally circular cavity or recesses area below the housing top 34. Of course, in other designs, the cartridge bay 46 may be located in some other part of the housing 32 or disposed above the housing top 34 or exposed in front of housing front 38. The cartridge bay 46 is centered about a drive axis A. That is, an imaginary drive axis A extending centrally though the cartridge bay 46, the significance of which will be described subsequently.

Figure 7:
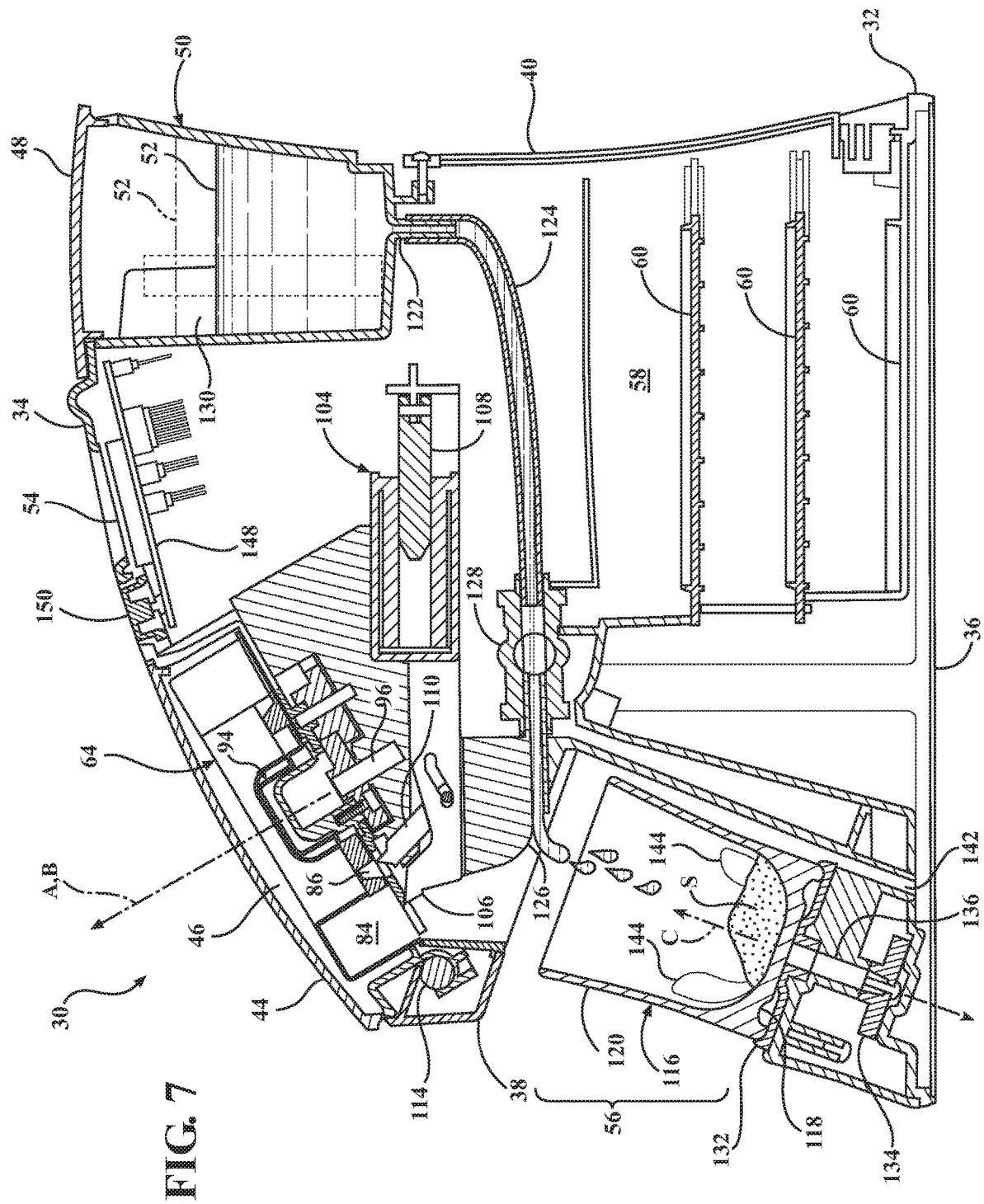
FIG. 7 is a cross-sectional view as in FIG. 3 but showing a still further moment in time when water from a water tank is directed into a mixing cup to be mixed with the granulated nutritional supplements drained from the lead serving chamber.
Figure 15:
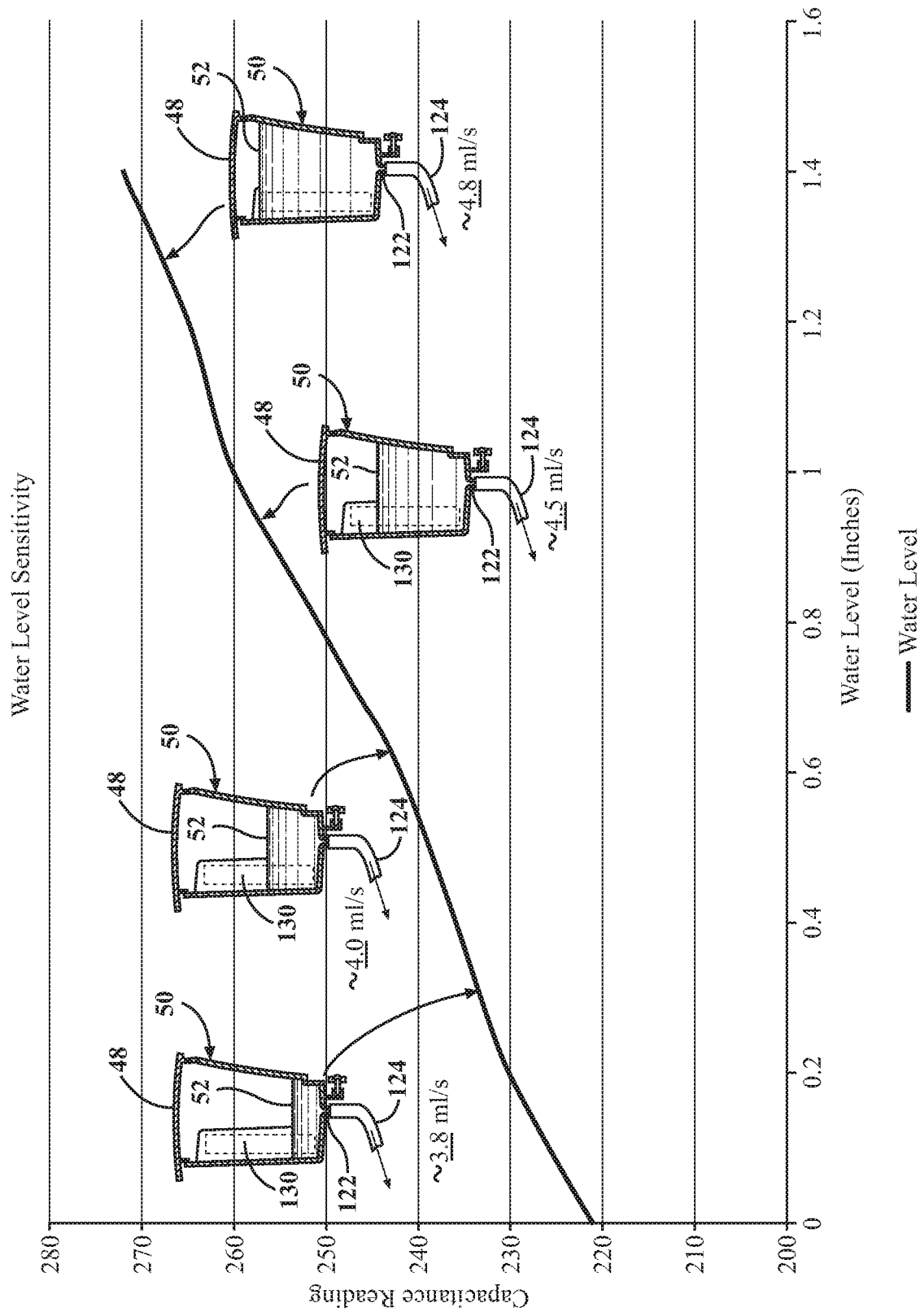
FIG. 15 is a diagram illustrating by way of example the change in capacitance reading for the fluid level monitor as a function of water level in the water tank and the corresponding effects on water flow rate.

Returning again to FIG. 1, the housing top 34 is shown including a tank lid 48. The tank lid 48 is, like the loading door 4, hinged to the housing top 34 about a transversely extending pivot axis. The tank lid 48 is located proximate the back 40 of the housing 32 and arranged to open from the rear. A water tank, generally indicated at 50, is disposed in the housing 32 below the tank lid 48 and configured to hold water at a water level 52. The water level 52, i.e., the upper surface of water that is contained within the water tank 50, is depicted in FIGS. 7 and 15. In alternative embodiments of this invention, not shown, the water tank 50 can be omitted when a direct supply of water is routed into the housing 32 via a suitable supply line. Additional details about the water tank 50 will be described below.

The housing top 34 further includes a graphic display screen 54. The display screen 54 may be of any suitable type including, but not limited to, an LCD, LED or OLED system with or without touch-screen functionality. The display screen 54 communicates with the user concerning operational status and fault conditions of the dispensing machine 30. Examples of various contemplated display screen 54 communications are provided in FIGS. 16A-D, 17A-C, 18A, 19A, 22A and 23A, and will be described in substantial detail further below.

Figure 2:
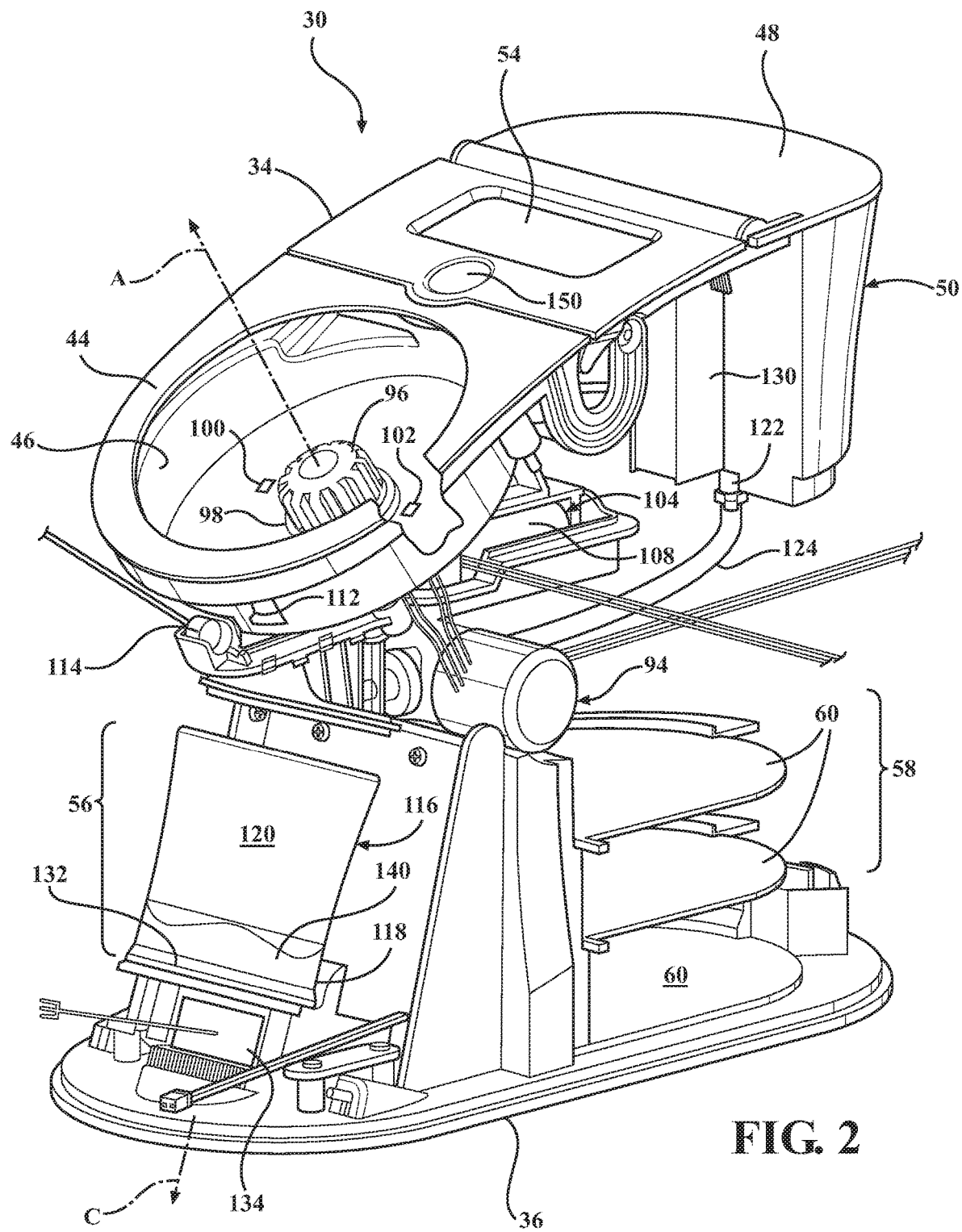
FIG. 2 is a perspective view as in FIG. 1 but with a portion of the outer housing removed to reveal internal components of the machine.
Figure 3:
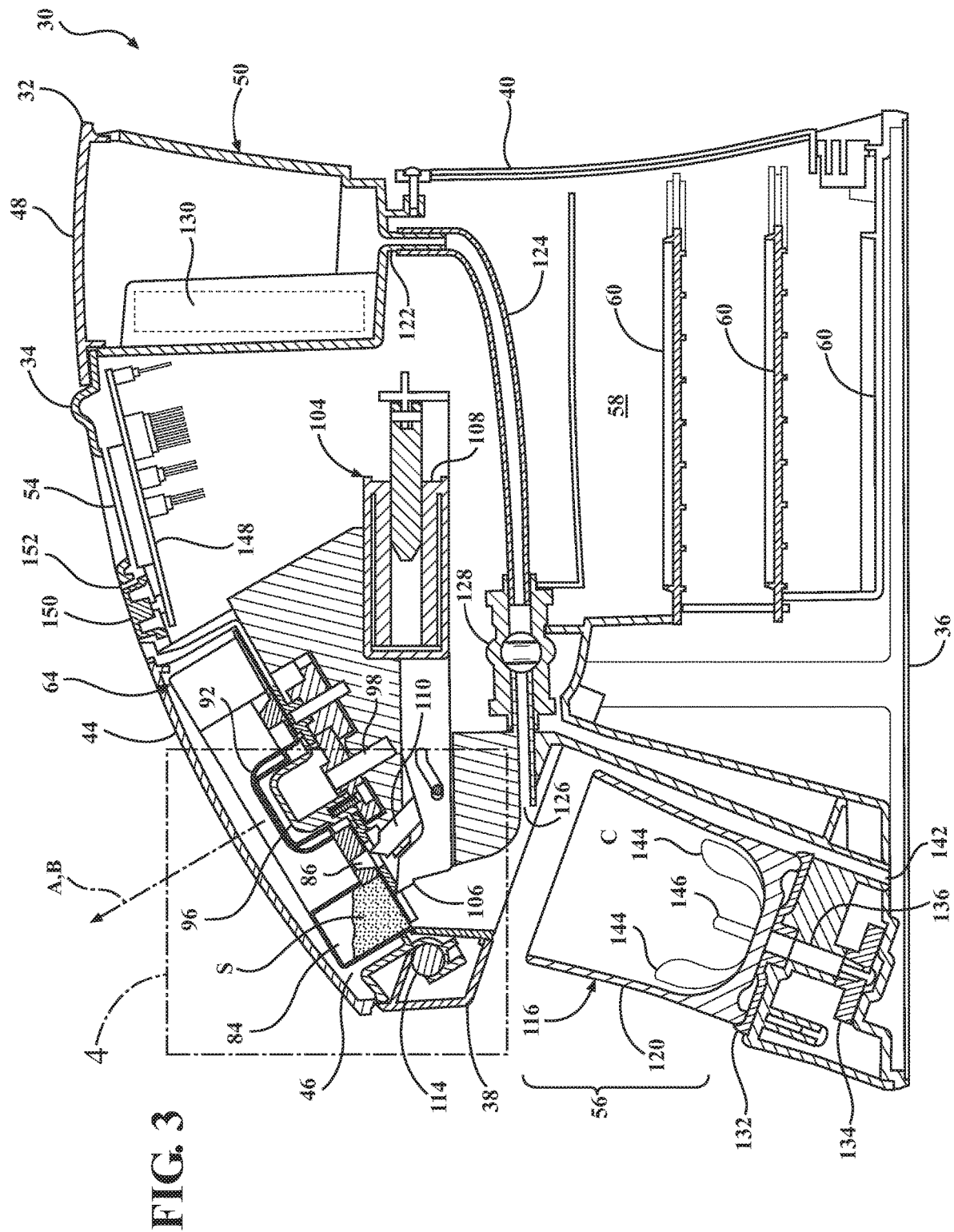
FIG. 3 is a longitudinal cross-section taken generally along lines 3-3 of FIG. 1.

A cup bay 56 is also formed in the housing 32. The cup bay 56 is preferably disposed directly below the cartridge bay 46, for easy access along the housing front 38. The housing 32 may also include an optional storage bay 58 disposed, in the illustrated example, below or underneath the water tank 50. The storage bay 58 may be fitted with a plurality of storage shelves 60 for storing certain items as will be described further below. The storage shelves are best shown in FIGS. 2, 3 and 7. The storage bay 58 may be enclosed by a storage door 62 as shown in FIG. 1. The storage door 62 in the illustrated embodiment is hinged about a vertical axis and moveable between open and closed positions like a cupboard door to enclose contents stored on the storage shelves 60 in the storage bay 58. A notch may be provided in the housing side 42 as clearance for a person's thumb to easily catch and flip open the outer swinging edge of the storage door 62.

The dispensing machine 30 is designed to accept a supplements cartridge, generally indicated at 64 throughout the figures, in the cartridge bay 46. The supplements cartridge 64 contains a plurality of doses of a nutritional supplement S (FIG. 4), wherein the nutritional supplement S may be of any type and for any purpose that is ingested or applied to a person or animal or other living thing for health purposes, including but not limited to granulated pharmaceutical compounds. Most commonly, the dispensing machine 30 is used to extract one dose from the supplements cartridge 64 each day by each user. However, depending on the specific nutritional supplement S contained in the supplements cartridge 64, more or less than one dose may be indicated each day or other time interval. In the example of a multi-vitamin type of nutritional supplement where the user is a nominally healthy adult man or woman, the recommended dosage may be one dose extracted from the supplements cartridge 64 each day. In the example of a body-building type of nutritional supplement where the user is a competitive athlete, the recommended dosage may be multiple doses extracted from the supplements cartridge 64 each day. The supplements cartridge 64 may take any of various forms suitable to hold and dispense individual doses of a given granular or powder nutritional supplement, including the form of a strip, of a drum, of a matrix, of a blister pack, of a loose container or hopper, or the like. In the portrayed examples, however, the supplements cartridge 64 takes a rotary form, having a diskshaped frame 66 centered about a central axis B. The supplements cartridge 64 is configured to rest in the cartridge bay 46 of the housing 32 with its central axis B aligned with the drive axis A. That is, when the exemplary rotary style supplements cartridge 64 is placed into the dispensing machine 30, its central axis B lines up with the drive axis A as perhaps best shown in FIG. 1.

FIGS. 10-13 best illustrate the exemplary rotary style supplements cartridge 64 in one preferred configuration, but by no means the only possible configuration. Again, it is to be emphasized that the supplements cartridge 64 could be reconfigured in any of several non-rotary styles, including but not limited to as a strip, a matrix, a blister pack, a loose container or hopper, or such. In the preferred rotary configuration, however, the frame 66 of the supplements cartridge 64 is a generally flat or sheet-like annular member having an outer peripheral flange 68 about its exterior and an interior hole 70 centered about the central axis B. The body of the frame 66 between its outer peripheral flange 68 and interior hole 70 can be beneficially considered according to it several annular bands or regions. An outermost annular region 72 occupies the band closest to or adjacent the peripheral flange 68. Like its outer bordering peripheral flange 68, the outermost annular region 72 is also centered about the central axis B. An innermost annular region 74 occupies the band closest to or adjacent the adjacent the interior hole 70, and is also centered about the central axis B. The body of the frame 66 further includes an intermediate annular region 76 that is disposed between the outermost 72 and the innermost 74 annual regions.

A plurality of chamber openings 78 are arranged in the outermost annular region 72 of the frame 66. That is to say, in the annular band or region of the frame that is proximate to the outer peripheral flange 68, an array of chamber openings 78 are placed or formed. The chamber openings 78 are arranged, preferably, in equal radial and circumferential increments about the central axis B within the outermost annular region 72. In other words, the chamber openings may be neatly set in a circular pattern around the frame 66 within its outermost annular region 72. The exact number of chamber openings 78 may vary depending on the nature of nutritional supplement S to be dispensed, intended application, and other factors. In one contemplated embodiment, the number of chamber openings 78 will be selected as a whole number multiple of an overall coverage period for the supplements cartridge 64. That is, the coverage period is the period of time the supplements cartridge can be used by a user to deliver the recommended number of doses. For examples, the coverage period for a given supplements cartridge 64 could be one week, two weeks, four weeks or one month. Other coverage periods are certainly possible. In the example of a one month coverage period where one dispensed dose per day is recommended, the number of chamber openings 78 could be selected at thirty or thirty-one. Alternatively, if two doses per day are recommended and the coverage period is two weeks, the supplements cartridge 64 may be configured with twenty-eight (two times fourteen) chamber openings 78. In yet another example, if three doses per day are recommended and the coverage period is one week, the supplements cartridge 64 may be configured with twenty-one (three times seven) chamber openings 78. While a wide range of the number of chamber openings 78 is possible, in the preferred embodiments the number of chamber openings 78 will be between twenty-eight and thirty-one.

Figure 11:
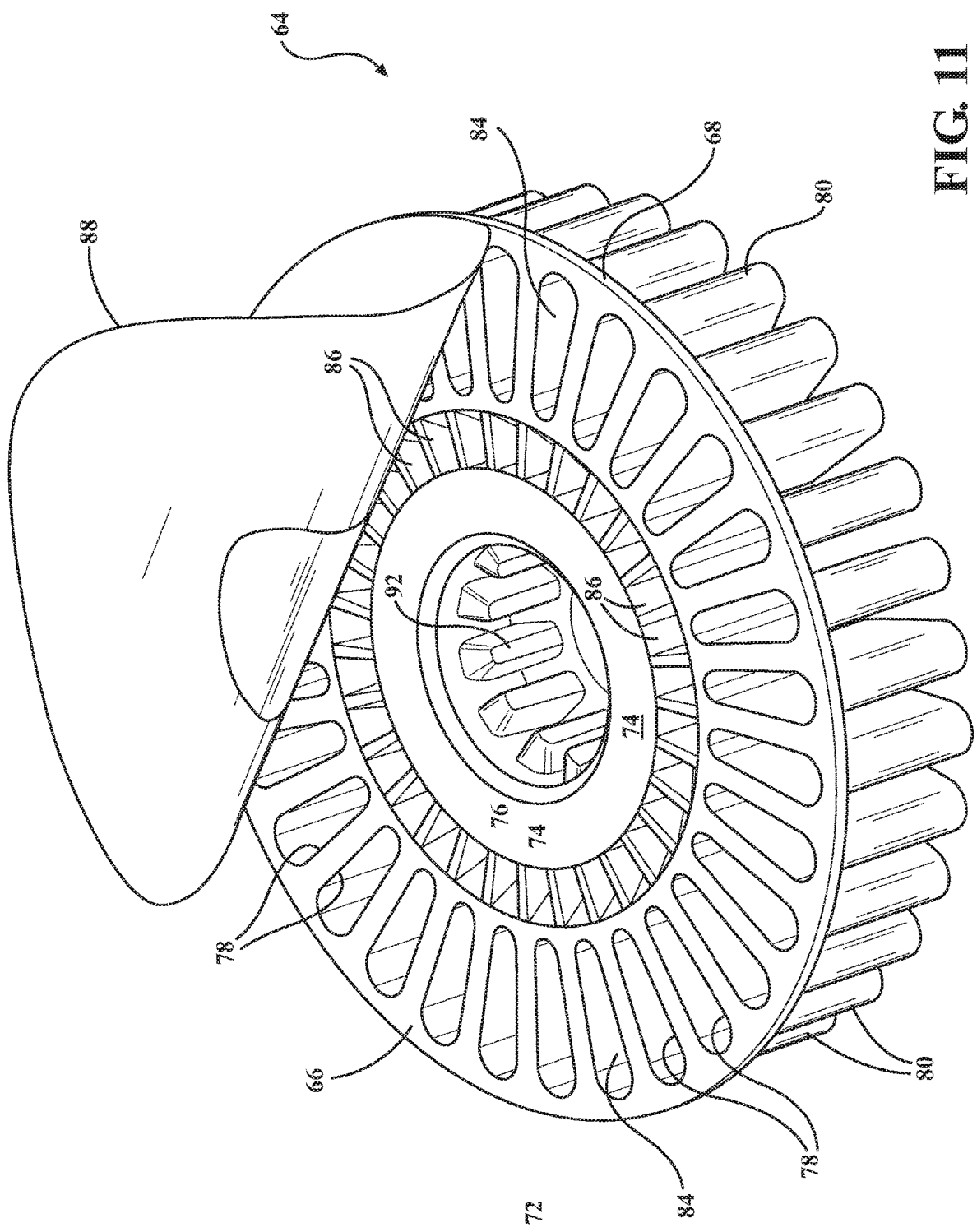
FIG. 11 is a perspective view of a supplements cartridge according to one embodiment of the invention, and illustrating the membrane partially peeled away to expose the annular arrays of serving chambers and associated marker cavities.
Figure 13:
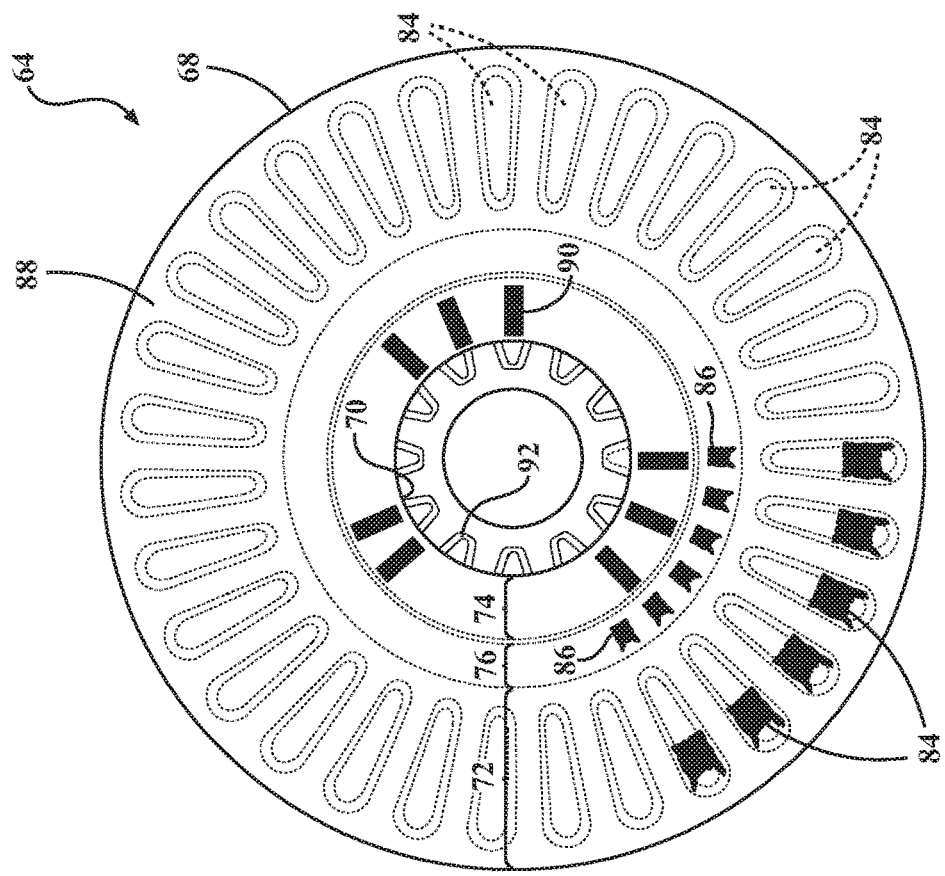
FIG. 13 is a view as in FIG. 12 but where the exemplary supplements cartridge has previously had six serving chambers opened and their associated marker cavities ruptured.
Figure 12:
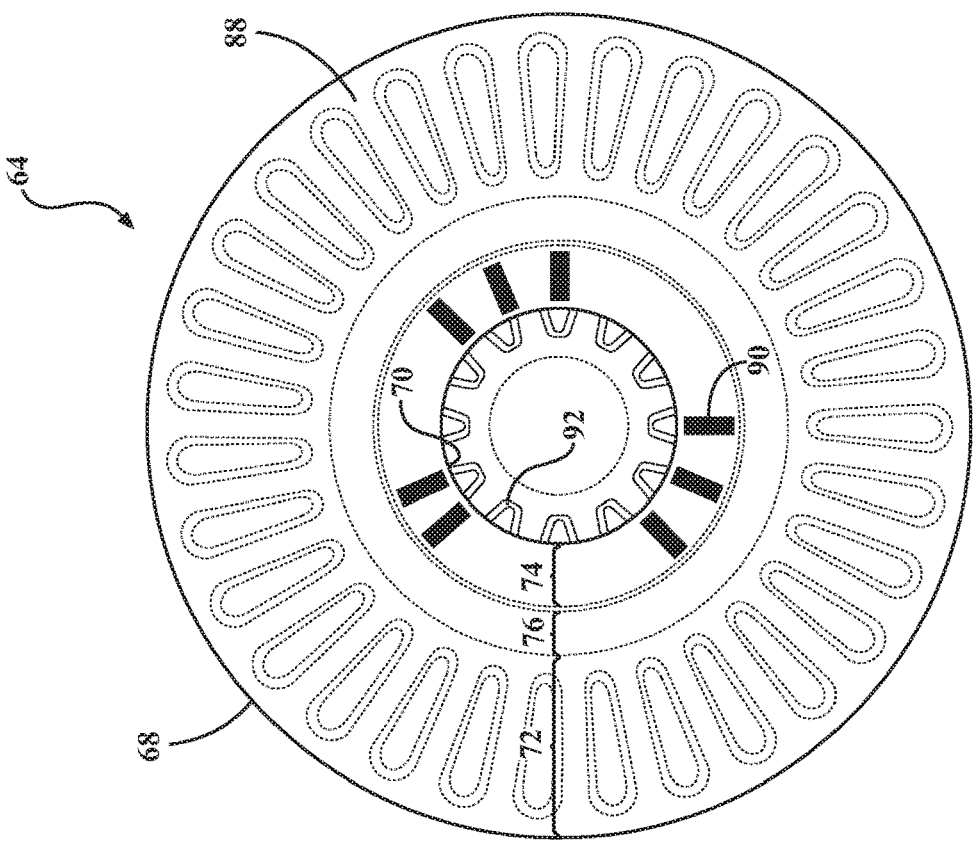
FIG. 12 is a bottom view of an unused exemplary supplements cartridge showing the membrane without any puncture marks.

As best shown in FIGS. 11-13, each chamber opening 78 has a radially widening, i.e., wedge, shape to maximize use of the outermost annular region 72 into which they are placed. The radially widening or wedge-like shape is narrowest adjacent the intermediate annular region 76 and widest adjacent the peripheral flange 68. Sidewalls 80 surround each chamber opening 78 and extending generally perpendicularly from the frame 66. The sidewalls 80 for each respective chamber opening 78 are covered by a closed end 82 to form a serving chamber 84 behind each chamber opening 78. The dry granulated or powdered nutritional supplement S is disposed in each serving chamber 84, and typically comprises one measured dose. Therefore, the number of serving chambers 84 in the supplements cartridge 64 corresponds to the number of doses or servings that supplements cartridge 64 is able to deliver. For example, thirty-one doses can be extracted from a supplements cartridge 64 that has thirty-one serving chambers 84. Twenty-eight doses can be extracted from a supplements cartridge 64 that has twenty-eight serving chambers 84. And so forth. In the preferred embodiment, a generally equal volume and composition of granulated nutritional supplement S is disposed in each serving chamber 84. However, it is contemplated that in some applications it may be desirable to place an unequal volume and/or composition of nutritional supplement S in the serving chambers 84. As one example of the latter statement, consider a situation where one dose per day is recommended of three separate nutritional supplements S. A supplements cartridge 64 may be fashioned in which its coverage period is one week and it is configured with twenty-one serving chambers 84. In this case, every third serving chamber 84 can be filled with the first nutritional supplement, the next adjacent serving chambers 84 filled with the second nutritional supplement, and the remaining serving chambers 84 filled with the third nutritional supplement. Once daily over the course of one week, the user extracts nutrition supplements from three sequential serving chambers 84 and thereby receives one dose per day of the three separate nutritional supplements S. In another example, there may be cases where a nutritional supplement is a blend of several components, and certain specific components to not mix well with other specific components. In these instances, a single dose comprises the combination of the two non-mixing agents. It may be desired to place the non-mixable components in separate (usually adjacent) serving chambers 84 to be extracted and mixed only at a moment just prior to consumption.

Referring still to FIGS. 11-13, each serving chamber 84 is preferably associated with a marker zone 86. If the supplements cartridge 64 is configured with thirty serving chambers 84, then there are preferably also thirty marker zones 86. The ratio is preferably 1:1; one marker zone 86 for each serving chamber 84 regardless of the number of serving chambers 84. The marker zones 86 may take any suitable form, with some alternative examples given below. In the illustrated embodiment, however, the marker zones 86 are located exclusively in the intermediate annular region 76. Like the chamber openings 78, the marker zones 86 are also preferably arranged in equal radial and circumferential increments about the central axis B within the intermediate annular region 76. And also likewise, the plurality of marker zones 86 correspond in number to the plurality of chamber openings 78, with each marker zone 86 being radially aligned with a respective one of the chamber openings 78. Each marker zone 86 is defined by a marker cavity, which is located directly is behind each marker zone 86 in the form of a well of cup-like formation. The marker zones 86 are preferably spaced apart from the serving chambers 84 for reasons that will be more fully explained below. Also as will be described more fully below, the marker zones 86 are configured to be physically altered or even mutilated as a means of keeping track of which serving chambers 84 have been opened and which remain full of un-extracted nutritional supplement.

Each serving chamber 84 is provided with a fracturable element of some kind that is configured to be forcefully ruptured in order to extract the volume of granulated nutritional supplement S contained therein. It is contemplated that the fracturable element could take any of various forms, including a stress-concentrating breakage line in the sidewalls 80 of each serving chamber 84, a tear-open paper section, or perhaps a peel-away seal covering each chamber opening 78. Many other possibilities exist. In the illustrated examples, the fracturable element comprises a punctureable membrane 88 that is disposed in surface-to-surface relationship over the flat face of the frame 66 so that the chamber openings 78 and the marker zones 86 are fully covered. An adhesive (not shown) can be applied to the frame 66 to create a hermetic seal for each serving chamber 84. Nutritional supplements S stored in each serving chamber 84 will be safely (i.e., medically) sealed by the glued-on membrane 88 so that the trapped supplements remain clean and sterile with a long shelf life. The membrane 88 preferably has an inner hole aligned with the interior hole 70 of the frame 66.

The membrane 88 is fractured over a given chamber opening 78 to extract the nutritional supplements S from the underlying serving chamber 84. Concurrently therewith, the membrane 88 is also ruptured over the corresponding marker zone 86 to indicate that its associated serving chamber 84 has been opened. By "concurrently," it is meant to broadly define a sequence of events that happened generally close in time or even simultaneously. For example, the membrane 88 may be ruptured over a particular serving chamber 84 and then shortly thereafter the membrane 88 over the corresponding marker zone 86 is ruptured. Or, the membrane 88 over a marker zone 86 could be punctured and shortly thereafter the associated serving chamber 84 is opened. Or, the membrane 88 covering the serving chamber 84 could be ruptured simultaneously with the corresponding marker zone 86 being punched through. In this manner, the marker zones 86 are configured to be physically altered by puncturing the membrane 88 covering into the respective marker cavities concurrently with the associated serving chambers 84. The membrane 88 may comprise a foil-like material, a plastic material, a paper-based material, or any other suitable composition. Most preferably, the membrane 88 has an outer reflective surface or other reflective properties capable of reflecting a beam of light (within a selected range of wavelengths along the light spectrum). White and silver are two good color choices for the outer reflective surface of the membrane 88. FIG. 12 shows the membrane 88 of an unused supplements cartridge 64. Serving chambers 84 and marker zones 86 below the membrane 88 are indicated by hidden lines. FIG. 13 shows the same supplements cartridge 64 as in FIG. 12, but after six doses have been extracted. In particular, the six contiguous serving chambers 84 between the six o'clock and eight o'clock positions have been opened as will be apparent by the corresponding breaches in the membrane 88 through which the powdered nutritional supplements S have been extracted. Marker zones 86 associated with each of the six opened serving chambers 84 are also shown as having been punctured. Hence, it will be seen by comparison of FIGS. 12 and 13 that the membrane 88 is ruptured both over a chamber opening 78 and over its corresponding marker zone 86 to indicate that the associated serving chamber 84 has been opened.

In alternative contemplated configurations, some other action altogether may be taken to identify a used marker zone 86. This may include a simple ink dabbing on the membrane 88, a nibble or bite of frame 66 material removed from the peripheral flange 68, or any other marking action that fulfills the objective of keeping track of which serving chambers 84 have been opened and which remain full of un-extracted nutritional supplement. And preferably, the marker zones 86 are spaced apart from the serving chambers 84, however in some contemplated embodiments the marker zones could be integrated with the fracturable element of the serving chambers 84 so that the serving chamber 84 per se is used to identify whether it has been previously opened or not.

Optionally, the supplements cartridge 64 may include binary code indicia 90 imprinted on, or otherwise appearing on, the membrane 88. Binary code indicia 90, in the form of bar codes in the illustrated examples, are placed so as to reside within the innermost annular region 74 of the frame 66, as shown in FIGS. 12 and 13. The binary code indicia 90, when used, are preferably machine-readable and associated with a look-up table or other reference data that may be used to identify important details about the supplements cartridge 64, including its coverage period, recommended dosing, intended uses, mixing instructions, etc. At least one starter queue indicia appears on the membrane 88, or is otherwise associated with the supplements cartridge 64, to provide a reference for the dispensing machine 30 to accurately open a first serving chamber 84 in a brand new, previously unused supplements cartridge 64. That is, without any previously opened serving chambers 84, the starter queue indicia guides the dispensing machine 30 to align with one of the serving chambers 84 that will be first opened. The starter queue indicia shown in FIGS. 12 and 13 is integrated with the binary code indicia 90, such that the placement of the bar code markings will allow the dispensing machine 30 to radially align itself with a select one of the serving chambers 84. In alternative embodiments, not shown, the starter queue indicia could comprise a machine-readable marking disposed on the membrane 88 adjacent the peripheral flange 68 or in some other location of the supplements cartridge 64.

Still considering the supplements cartridge 64, a spline cup 92 may be affixed to the frame 66, generally centered over the interior hole 70. The spline cup 92 includes a plurality of axially extending female splines, as shown in FIG. 11. The female splines in the spline cup 92 are thus accessible thought the interior hole 70. An outer surface of the spline cup 92 is preferably configured as a graspable handle. See, for examples, FIGS. 1 and 10 where the outer surface of the spline cup 92 is visible as a knob-like element that can be easily grasped with the human hand to insert and remove the supplements cartridge 64 into/out of the cartridge bay 46.

A cartridge drive mechanism, generally indicated at 94, is disposed in the housing 32 for rotating the supplements cartridge 64 about its central axis B within the cartridge bay 46. The cartridge drive mechanism 94 can be manually operated or motor-driven. In the illustrated embodiment, the cartridge drive mechanism 94 is motor-driven by at least one cartridge motor, in the form of a stepper-motor, as perhaps best shown in FIG. 2. A rotary output shaft 96 is operatively coupled to the electric motor, and extends into the cartridge bay 46 for power-driven rotation about the drive axis A. The rotary output shaft is shown in FIG. 2, as well as in FIGS. 3, 4 and 7. Preferably, the drive axis A and the output shaft 96 are oriented at a forward-tilted angle relative to horizontal. This forward tilt enables a user to more conveniently interact with the dispensing machine 30, and in particular to easily insert and remove a supplements cartridge 64 from the cartridge bay 46. The forward-tipped condition of the output shaft 96 holds the supplements cartridge 64 at a corresponding angle so that it can be conveniently observed through a transparent loading door 44, as is the case in FIG. 2. Furthermore, by supporting the supplements cartridge 64 at a forward slanting angle, a lead serving chamber 84 will be better positioned to be emptied as will be described in greater detail subsequently.

The output shaft 96 is preferably configured with a drive coupling that operatively engages with the female splines in the spline cup 92 of the supplements cartridge 64. Thus, when a supplements cartridge 64 is placed in the cartridge bay 46 as shown for examples in FIGS. 1 and 2-7, male splines on the output shaft 96 mesh or mate with the female splines of the spline cup 92 so that power-driven rotation of the output shaft 96 is transferred to the supplements cartridge 64. Of course, other power transmission arrangements are possible, including for example where a free-wheeling bearing is stationed along the drive axis A and a tangential power drive wheel interacts with the peripheral flange 68 or perhaps a tangential cog-wheel interacts with the sidewalls 80 of the serving chambers 84. Many alternative drive configurations are certainly possible, with the illustrated embodiment providing but one example. In the illustrated embodiment, the drive coupling is provided with an annular shelf 98 that supports the supplements cartridge 64 from underneath. Perhaps best shown in the enlarged views of FIGS. 4-6, the annular shelf 98 is a protruding flange-like feature below the male splines of the output shaft 96. The frame 66 of the supplements cartridge 64 rests on the annular shelf 98 so that the covering membrane 88 rides just above the floor of the cartridge bay 46. In this manner, the supplements cartridge 64 might appear to hover above the floor of the cartridge bay 46. The annular shelf 98 engages the frame 66 about the periphery of the interior hole 70, while the intermeshing splines center the central axis B of the supplements cartridge 64 with the drive axis A of the output shaft 96.

Figure 10:
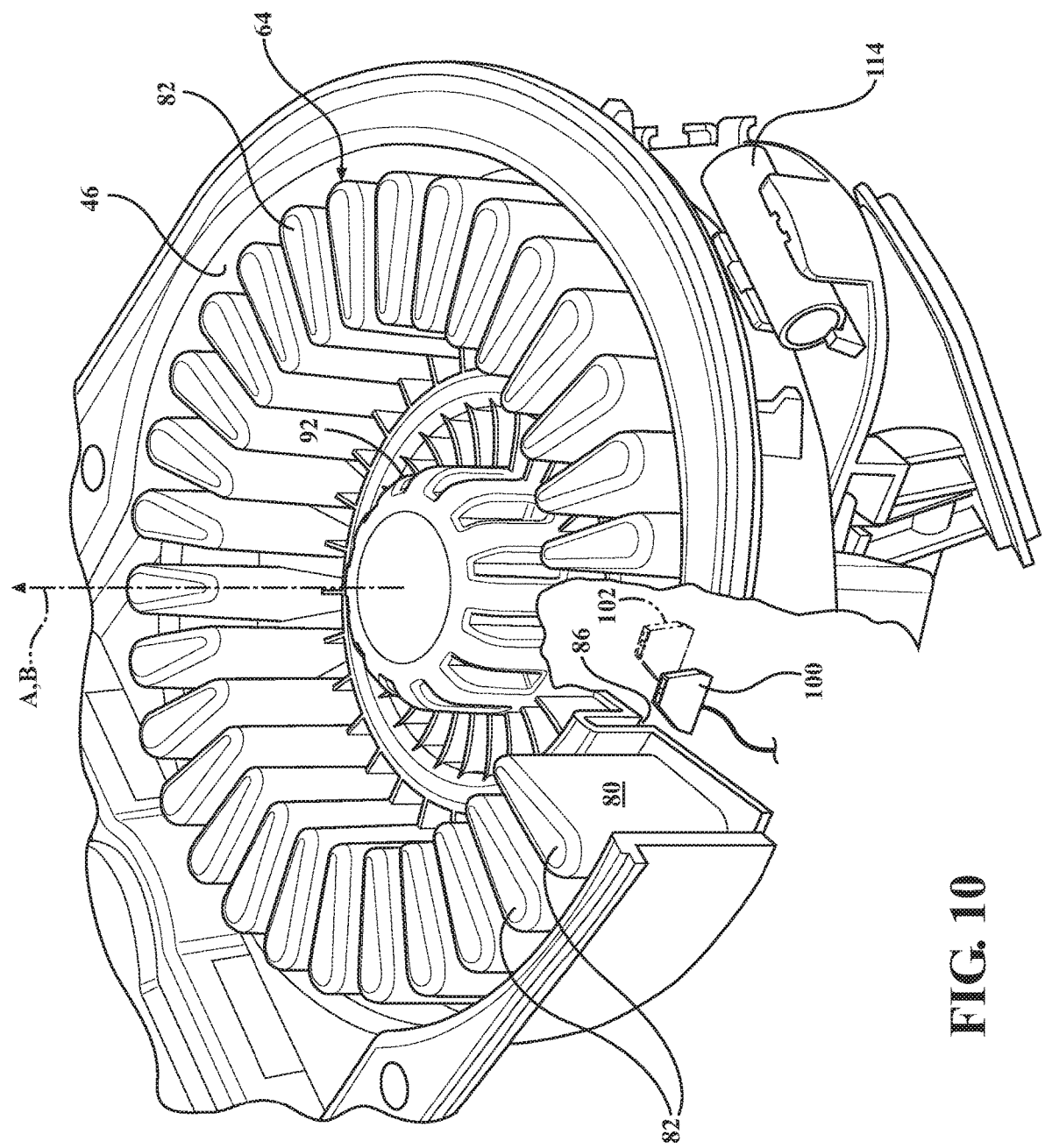
FIG. 10 is a fragmentary view of the cartridge bay showing a supplements cartridge disposed therein, the supplements cartridge being partially broken away to depict first and second optical sensors disposed thereunder which are effective to scan for punctured marker zones and binary code indicia, respectively.

Turning now to FIGS. 2 and 10, the dispensing machine 30 may include a first optical sensor 100. The first optical sensor 100 may be of any suitable commercial type including, for example, a self-contained photoelectric sensor of the retro-reflective variety having integrated transmitter and receiver elements. Generally stated, the transmitter generates a light beam that is reflected back to the receiver within a first sensor field of view. A field of view, also known as a field of vision, may be generally understood as a solid angle through which the receiver element, i.e., of the first optical sensor 100 in this case, is sensitive to a reflected light beam (in the wavelength range of interest). An object or condition is sensed by the first optical sensor 100 when the transmitted light beam is interrupted and fails to reach its receiver element. As but one example, suitable results have been achieved with reflective object sensors available from OPTEK Technology, Inc. of Carrollton, Tex. that are mounted side-by-side on converging optical axes in a black plastic housing focusing on a small area and depth of field and with or without dust protection and with or without features for improved target resolution. Such sensor devices may include an infrared emitting diode and a NPN silicon phototransistor or a photodarlington, and/or a red visible LED and a low light level rejection (RBE) NPN silicon phototransistor to allow better contrast ratio when detecting black marks on a white surface. Sensor types other than the retroreflective variety may be used. The first optical sensor 100 is preferably disposed in the housing 32 at a position that is radially offset from the drive axis A, and further so that its first sensor field of view is oriented toward the cartridge bay 46.

As shown perhaps best in FIG. 10, the first optical sensor 100 may be positioned so that its first sensor field of view is configured to image the intermediate annular region 76 of the membrane 88 when a supplements cartridge 64 is disposed for use in the cartridge bay 46. The marker zones 86 are located within the intermediate annular region 76, and will therefore pass through the first sensor field of view when the supplements cartridge 64 is rotated about the drive axis A. That is to say, the first optical sensor 100 is responsive to the condition of the membrane 88 covering the marker cavities. If the membrane 88 over a marker zone 86 has not been punctured, then light from the transmitter element of the first optical sensor 100 will be reflected by the reflective outer surface of the membrane 88 back to the receiver element of the first optical sensor 100 thus registering an unopened corresponding serving chamber 84. Conversely, if the membrane 88 over a marker zone 86 has been ruptured, then light will not be reflected by the reflective foil surface back to the first optical sensor 100 thus registering an opened corresponding serving chamber 84. In the example of the supplements cartridge 64 of FIG. 12 being placed in the cartridge bay 46 and rotated at least 360° by the cartridge drive mechanism 94, the first optical sensor 100 would register all thirty-one serving chambers 84 as unopened. However, in the example of the supplements cartridge 64 of FIG. 13 placed in the cartridge bay 46 and rotated at least 360°, the first optical sensor 100 would register six of the thirty-one serving chambers 84 as opened, and the remaining twenty-five serving chambers 84 unopened. The computer control system will also note the angular or circumferential position(s) of the opened and unopened serving chambers 84.

The dispensing machine 30 may further include a second optical sensor 102 disposed in the housing 32, as shown in FIGS. 2 and 10. The second optical sensor 102 is shown in phantom in FIG. 10 disposed adjacent the first optical sensor 100, but other locations within the housing 32 may be equally or even more convenient. For example, FIG. 2 shows the second optical sensor 102 nearly diametrically opposed (vis-à-vis the drive axis A) to the first optical sensor 100. That is, FIG. 2 shows the first optical sensor 100 located in generally the 9 o'clock position and the second optical sensor 102 generally in the 3 o'clock position, however these locations could be revered and could also be re-positioned as needed to accommodate placement of other components within the housing 32. A second sensor field of view of the second optical sensor 102, like the first sensor field of view, may be radially offset from the drive axis A and oriented toward the cartridge bay 46. However, the second sensor field of view is configured to image the innermost annular region 74 of a supplements cartridge 64 that is disposed for use in the cartridge bay 46. In this manner, the second optical sensor 102 is responsive to the binary code indicia 90. In the example of a simple bar code like that shown in FIGS. 12 and 13, the annularly arranged binary code indicia 90 is "read" by the second optical sensor 102 as the supplements cartridge 64 is rotated at least 360° by the cartridge drive mechanism 94. Light from the transmitter element of the second optical sensor 102 will be reflected by the reflective foil surface of the membrane 88 back to the receiver element of the second optical sensor 102 in between the large blackened radial stripes, but not reflected as the large blackened radial stripes transit the second optical field of view. The reflection-interruption pattern can be translated into a machine-readable code that may, in turn, be associated with a look-up table to indicate important attributes of the supplements cartridge 64, such as composition of the nutritional supplements S contained therein, recommended dosing, mixing directives, and the like. Also, the previously mentioned starter queue indicia may be configured to traverse the second sensor field of view. In the examples of FIGS. 12 and 13, the starter queue indicia is integrated into the binary code indicia 90, so that the position of at least one of the large blackened radial stripes aligns with the centerline of a lead serving chamber 84, in these cases the serving chamber 84 located at the six o'clock position.

In FIGS. 3-6, the dispensing machine 30 is shown including a supplement extraction mechanism, generally indicated at 104. The supplement extraction mechanism 104 is preferably disposed in the housing 32, and is operative to open the serving chambers 84 one-at-a-time and also to empty the granulated nutritional supplement S therefrom. The supplement extraction mechanism 104 can take many different forms depending on the particular configuration of the fracturable element of the serving chambers. The supplement extraction mechanism 104 can be manually actuated or configured as an automated, motor-driven feature of the dispensing machine 30. In the illustrated embodiment, the supplement extraction mechanism 104 is automated by a computer control system. The supplement extraction mechanism 104 shown in the figures includes a lance 106 that is supported for linear movement in the housing 32. The lance 106 has a pointed tip that is extendable into the cartridge bay 46. The tip is configured to breach the membrane 88 in a region overlaying a lead serving chamber 84 of the supplements cartridge 64.

The lead serving chamber 84 is a transitory designation. For any new supplements cartridge 64, i.e., one that is characterized by having no previously unopened serving chambers 84, the lead serving chamber 84 is defined by the starter queue indicia. So, in the previously mentioned example of FIG. 12, the lead serving chamber 84 is the serving chamber 84 located at the six o'clock position. However, each time the supplements cartridge 64 is indexed for use, the lead serving chamber 84 will be set on an unopened serving chamber 84. In the illustrated examples, the lead serving chamber 84 of any partially used supplements cartridge 64 will be the next adjacent serving chamber 84 to the last opened serving chamber 84. And so, in the example of FIG. 13 where the supplements cartridge 64 has been partially used, the lead serving chamber 84 will be the first unopened serving chamber 84 encountered in a clockwise direction from the series of six previously opened serving chambers 84. Of course, the computer control system is not limited to selecting a lead serving cartridge in this manner. For example, if rotational balance is a concern, the computer control system may intentionally select an unopened serving chamber 84 that is diametrically opposed to a previously opened serving chamber 84 to be the lead, somewhat akin to the crisscross pattern used to tighten lug nuts on an automobile wheel. Other selection patterns for the lead serving chamber 84 may also be implemented depending on the designer's choice.

Working through the computer control system, as informed by the first 100 and second 102 optical sensors, the cartridge drive mechanism 94 automatically indexes the supplements cartridge 64 in the cartridge bay 46 so that the lead serving chamber 84 is located directly opposite the tip of the lance 106, as shown in FIGS. 3-7. The supplement extraction mechanism 104 is placed within the housing 32 so that the lead serving chamber 84 will always be at the lowest possible elevation, which in the exemplary embodiment will appear as a six o'clock position if the supplements cartridge 64 is imagined as a clock face and when viewed from the vantage of an ordinary user as in FIG. 1. That is to say, because the supplements cartridge 64 is supported at a forwardly tipped angle (drive axis A) within the cartridge bay 46, there will always be low elevation region and a high elevation region. The low elevation region of the supplements cartridge 64, which appears in FIGS. 3 and 7 as the far left side of the supplements cartridge 64, will always contain the lead serving cartridge 84 (i.e., when the supplements cartridge 64 is not rotating.)

Figure 4:
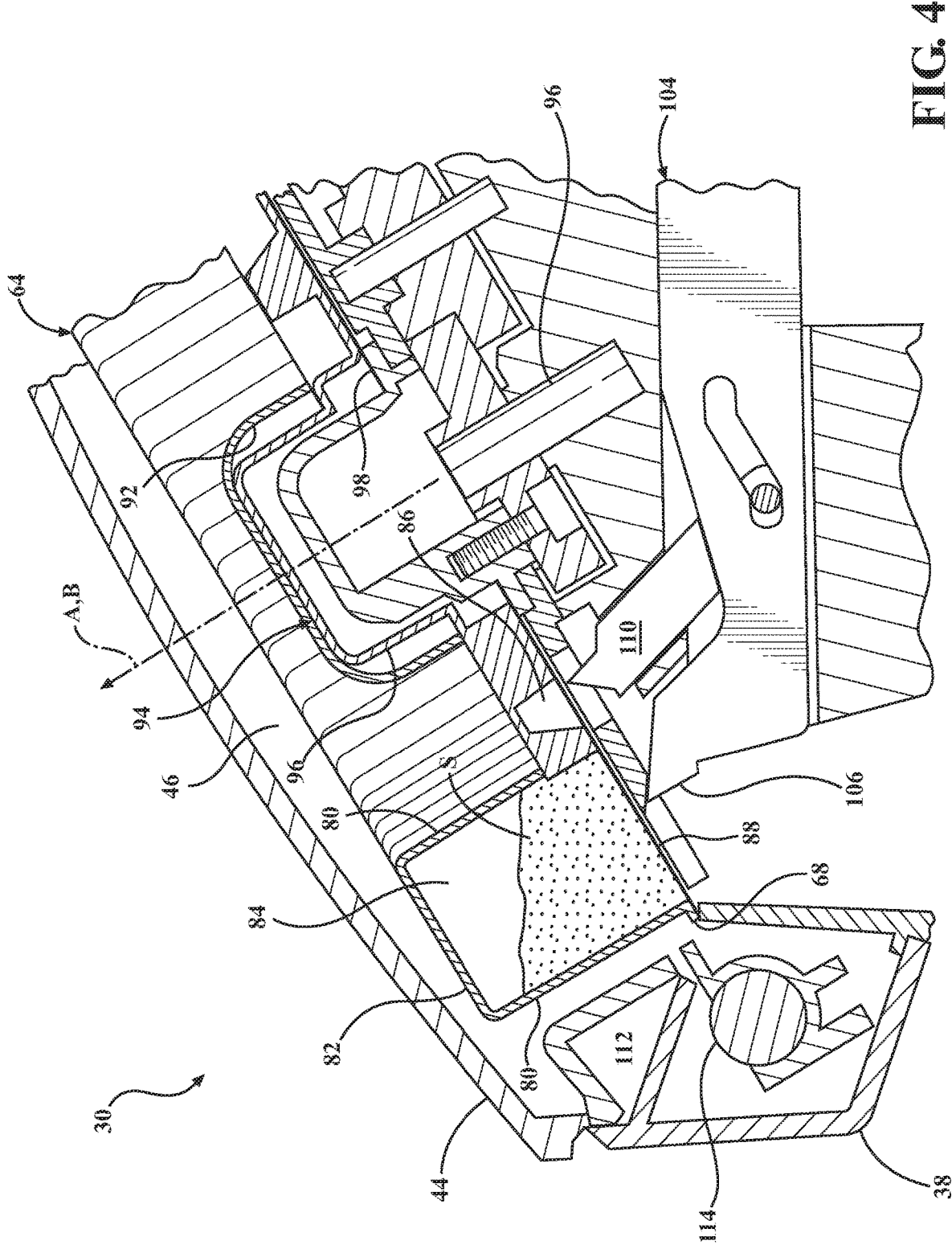
FIG. 4 is an enlarged view of the area indicated at 4 in FIG. 3.
Figure 5:
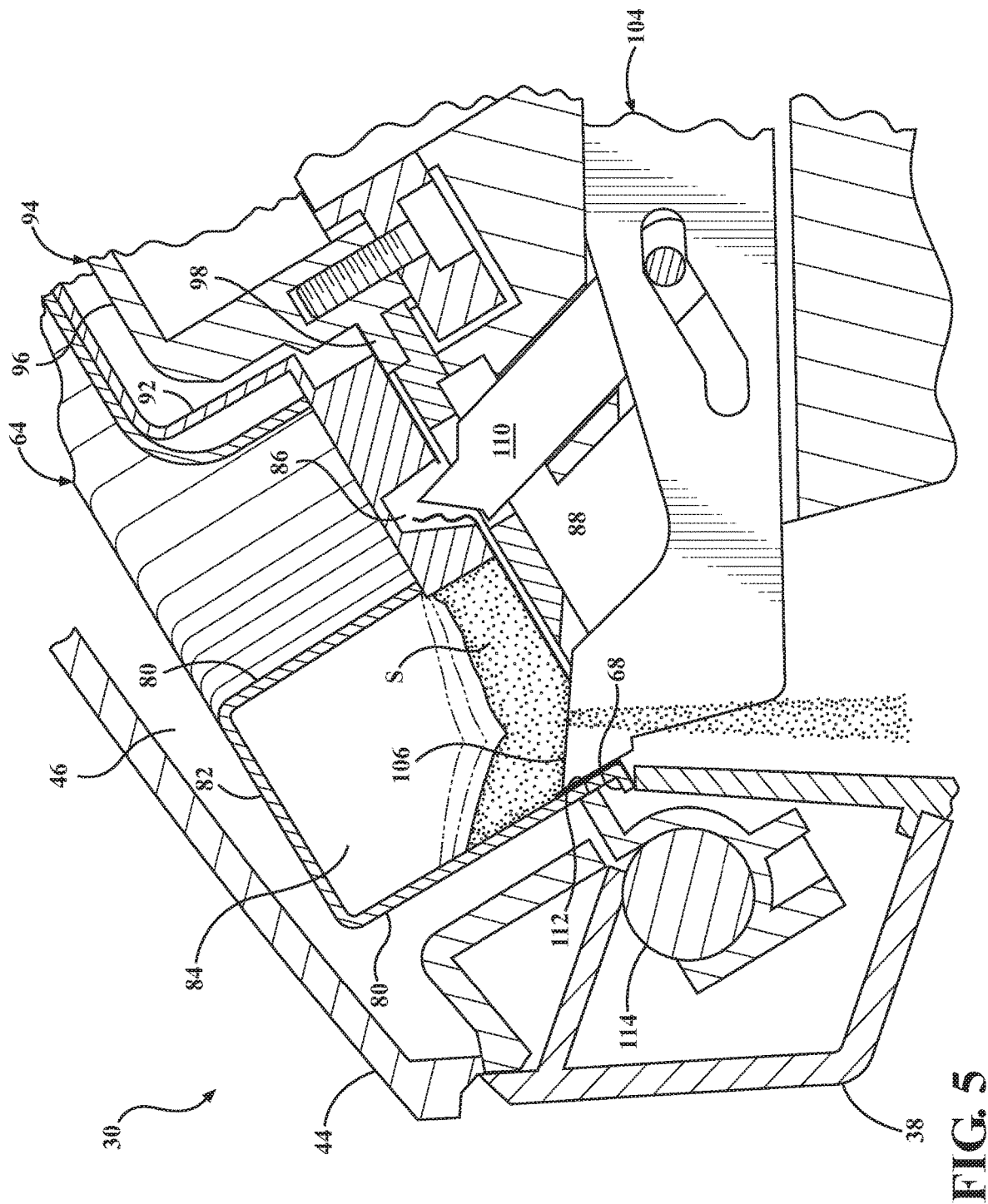
FIG. 5 is a view as in FIG. 4 showing subsequent moment in time when the lance and spur features of the supplement extraction mechanism have been actuated so as to open a lead serving chamber in the supplements cartridge.
Figure 6:
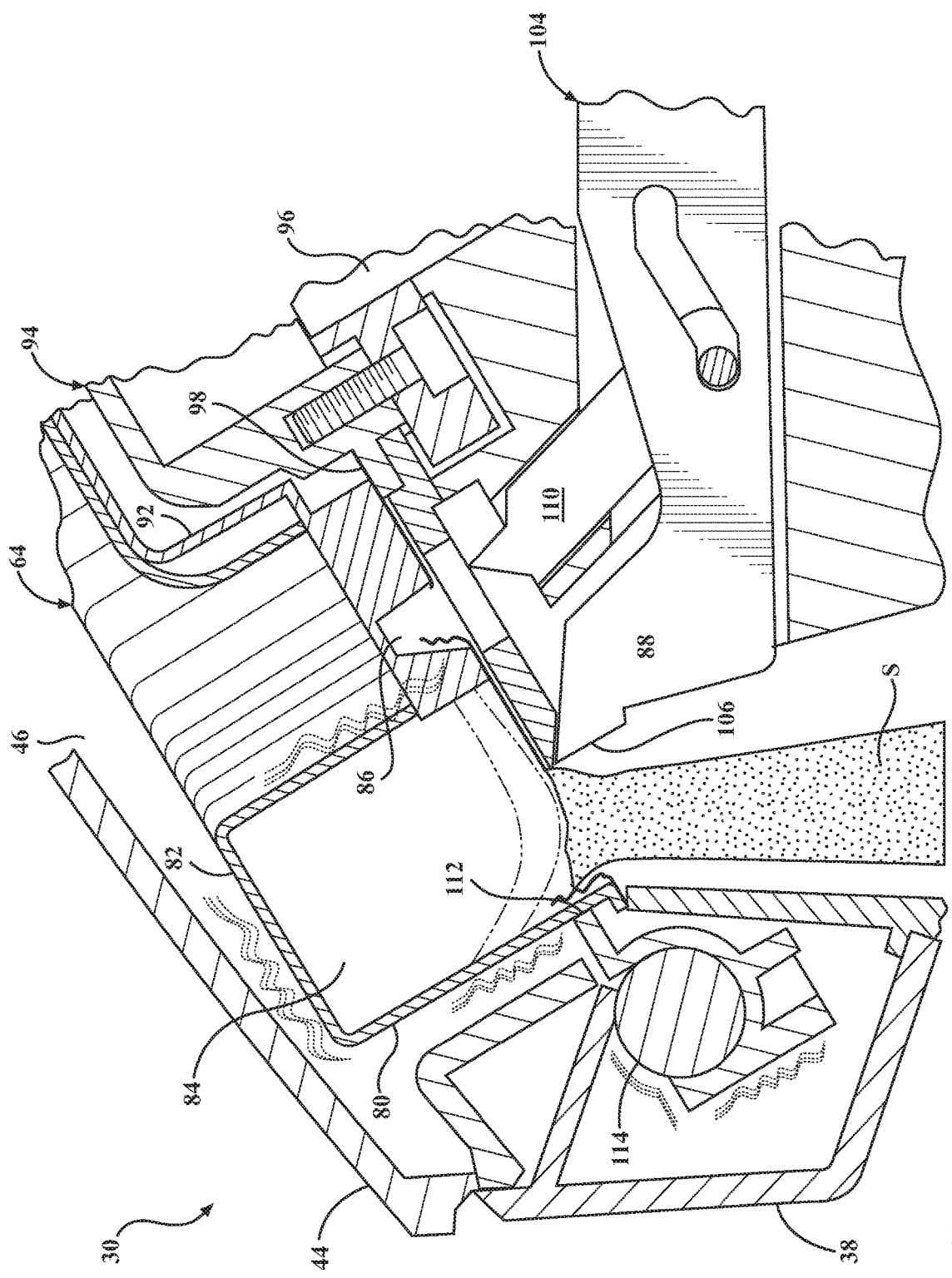
FIG. 6 is a view as in FIG. 5 showing a still further subsequent moment in time when the lance and spur features of the supplement extraction mechanism have been retracted to their initial starting position, with granulated nutritional supplements draining from the lead serving chamber and a vibrator energized to impart mechanical vibrations to the lead serving chamber through a buttress.

A solenoid motor 108 is operatively connected to the lance 106 and normally holds the lance 106 is a retracted condition as shown in FIGS. 3 and 4. When energized, the solenoid motor 108 thrusts the lance 106 forward, i.e., to the left as viewed in FIGS. 4-6, so that its tip ruptures the portion of the membrane 88 covering the lead serving chamber 84. In FIG. 5, the move in their respective paths but generally within a common vertical plane that passes through the radial centerline of the lead serving chamber 84 and also through the coincident axes A, B. The solenoid motor 108 operatively interconnect connects both the lance 106 and the spur 110 so that the spur 110 is actuated simultaneously with the lance 106. This operative connection can take many different forms. In the illustrated embodiment, the spur 110 includes a cam follower that is carried in a cam slot in the lance 106. As perhaps best shown in FIGS. 5 and 6, when the solenoid motor 108 is energized, a tip of the spur 110 is forcefully extended in an upwardly forward trajectory into the cartridge bay 46 so that it punctures the portion of membrane 88 that overlays the marker zone 86 associated with the lead serving chamber 84. In other words, the marker zone 86 is physically altered, i.e., mutilated, by the spur 110 concurrently upon extracting the nutritional supplements S from the lead serving chamber 84.

The supplement extraction mechanism 104 may be fitted with a buttress 112 disposed in the housing 32 adjacent the lead serving chamber 84 of a supplements cartridge 64 in the cartridge bay 46. The function of the buttress 112 is to provide a reinforcing backrest or stop against the combined thrusting forces of the lance 106 and spur 110. The buttress 112 may be either a static feature or a dynamic feature controlled by the computer control system. In the illustrated examples provided in FIGS. 3-7, the buttress 112 is disposed opposite the lance 106 and is configured to engage the sidewalls 80 of the lead serving chamber 84, on top of the peripheral flange 68. In one embodiment, the buttress 112 is supported for linear movement toward and away from the peripheral flange 68 of the frame 66, such as in a sliding tray that enables the buttress 112 to be pushed into a backstopping position for when the lance 106 and spur 110 are thrust out.

In this example, when the lance 106 and spur 110 return to their retracted positions (FIG. 6), the buttress 112 preferably remains in direct pressing contact with the supplements cartridge 64 so that a vibrator unit 114, operatively associated with the buttress 112, can be energized to impart mechanical vibrations to the lead serving chamber 84. These mechanical vibrations are graphically illustrated in FIG. 6. The vibrator unit 114 may be any commercially available type including, for example, the type used in cellular telephones or restaurant pagers. When selectively energized, the vibrating unit 114 transmits vibrations through the abutting buttress 112 into the lead serving chamber 84, which facilities complete drainage of the nutritional supplements S through the puncture opening in the membrane 88 so that substantially all of the contents are extracted. Naturally, many other techniques may be employed to encourage rapid and full drainage of the nutritional supplements S from the lead serving chamber 84 after it has been opened, such as a mechanical tapping on top of the lead serving chamber, rapid microreciprocating or shaking movements of the output shaft 96, mechanical vibrations through the output shaft 96, ultrasonic activity, etc.

As shown in FIG. 7, a mixing cup, generally indicated at 116, is configured to rest in the cup bay 56 of the housing 32 and directly below the lead serving chamber 84. When nutritional supplements S are extracted from the lead serving chamber 84 (FIGS. 5-6), the dry powder material falls like sand into the awaiting mixing cup 116. In one embodiment, the mixing cup 116 has a closed base 118 and generally cylindrical sides 120 terminating in an open mouth. The sides 120 or the mixing cup 116 may be at least partially transparent so that a user can see as the nutritional supplements S fall onto the base 118. In this manner, an interior region of the mixing cup 116 is configured to receive by gravity fall the granulated nutritional supplement S drained from the lead serving chamber 84.

Continuing still with FIG. 7, the water tank 50 is shown having an outlet 122. The water level 52 in the water tank 50 is elevated above the outlet 122 to establish a natural head of water pressure at the outlet. The value of the head pressure will of course change with the quantity of water in the tank 50. A conduit 124 extends from the outlet 122 to an exit end 126. The exit end 126 is ported to the cup bay 56, and more specifically located so that water emanating from the exit end 126 will confidently land inside the mixing cup 116. In the preferred embodiment, the exit end 126 of the conduit 124 is disposed vertically below the water level 52 so that the head of water pressure will enable water to flow by gravity from the water tank 50 into the mixing cup 116. In alternative embodiments, water movement into the mixing cup 116 is accomplished by line pressure (as in the case of a tankless, hard-plumbed dispensing machine 30) or by means of a pump contained within the housing 32. A flow control valve 128 is operatively associated with the conduit 124. The flow control valve 128 is selectively actuated via the computer control system to interrupt the flow of water through the conduit 124 so that a predetermined, metered amount of water is transferred into the mixing cup 116 where it mixes with the nutritional supplements S. The computer control system can be programmed to transfer water into the mixing cup 116 either before actuation of the supplements extraction mechanism 104, concurrently with actuation of the supplements extraction mechanism 104, or after actuation of the supplements extraction mechanism 104. FIG. 7 depicts the latter case, where the nutritional supplements S are fixed emptied from the lead serving chamber 84 prior to water being added. Both the timing and quantity of water addition to the mixing cup 116 are controlled via the flow control valve 128. In one contemplated embodiment, the binary code indicia 90 contains information that is used by the computer control system to determine the timing and quantity of water addition to the mixing cup 116 via manipulation of the flow control valve 128.

FIG. 15 is an exemplary chart describing the effect water level 52 has on the flow rate of water through the conduit 124. Generally stated, the higher the water level 52 in the tank 50, the greater the flow rate of water through the conduit 124. In the above-described embodiment where the computer control system regulates the quantity of water admitted to the mixing cup 116 via actuation of the flow control valve 128, accurate water quantity is a goal. Determining the quantity of water delivered into the mixing cup 116 can be accomplished in a variety of ways, including by direct flow rate measurements, metering pumps, and the like. In the present invention, one effective technique to assure an accurate quantity of water is mixed with the nutritional supplements S in the mixing cup 11 is to correlate the predicted flow rate through the conduit 124 based on a measurement of the water level 52. Such a measure can be made in many ways, including optically and through float-type potentiometers.

In the illustrated embodiment, wherein the water tank 50 is of the gravity fed type, an accurate and reliable real-time measurement of water level 52 is achieved by a fluid level monitor 130 that is operatively associated with the water tank 50. The fluid level monitor 130 includes a capacitive sensor, composed of a pair of opposing metallic plates, preferably fabricated from a copper material. The metallic plates are each isolated from water contained in the water tank 50. These metallic plates are electrically connected to the computer control system, which is configured to monitor the capacitance therebetween. The capacitance measurement has been found to change more-or-less proportionally with changes in the level 52 of water in the water tank 50. Through empirical testing, the capacitance measurement can be recorded for numerous water levels 52 together with the empirically derived flow rate, as shown in FIG. 15. This information can then be stored in a look-up table that is accessible by the computer control system of the dispensing device 30. Alternatively, the capacitance to flow rate relationship may be expressed as a mathematical formula rather than an empirically-derived data set. The water level 52 in the water tank 50 establishes a head pressure of water in the conduit 124. Naturally, the head pressure changes in direct proportion to changes in the water level 52 in the water tank 50. That is, the higher the water level 52, the greater the head pressure and the faster the water in the conduit 124 is motivated to flow. And conversely, the lower the water level 52, the lesser the head pressure and the slower the water in the conduit 124 is motivated to flow.

In operation, when there is a demand for water to be added to the mixing cup 116, the computer control system takes note of the instantaneous capacitance measurement via the fluid level monitor 130, and then associates the reported capacitance with a flow rate value in the lookup table. The time duration over which the flow control valve 128 must be opened is easily computed by dividing the desired quantity of water (either a preprogrammed amount or indicated in the binary code indicia 90) by the indicated flow rate as per the look-up table. It should be mentioned here also that the binary code indicia 90 may indicate that the contents from multiple serving chambers 84 should be mixed together at the same time in the mixing cup 116. In these cases, the computer control system will direct the actions of the cartridge drive mechanism 94, supplements extraction mechanism 104 and flow control valve 128 according to a predetermined sequence so that all of the desired nutritional supplements S and the proper quantity of water are combined in the mixing cup 116. Accordingly, the present invention takes advantage of the relationship of the water level 52 in a gravity feed tank 50 with the reported real-time measurements from the capacitive sensor 130 so as to keep the volume of water shots into the mixing cup 116 consistent, or if not consistent then to meet a predetermined specification, despite variations in the water flow rate from the exit end 126 of the conduit 124 caused by variations in water level 52/head pressure.

Preferably, the water and nutritional supplements S are mixed together thoroughly, or at least adequately, prior to a user ingesting them by drinking (or giving to another to be ingested by drinking). Mixing of the water and nutritional supplements S can be accomplished in a variety of ways, either in an intermediate mixing chamber (not shown) upstream of the mixing cup 116, or after the ingredients have been added to the mixing cup 116. In the illustrated embodiment, mixing takes place directly in the mixing cup 116, and hence the name given. It is contemplated that mixing of the water and nutritional supplements S in the mixing cup 116 can also be accomplished in a variety of ways, such as by shaking or spinning the mixing cup 116, by inserting a mixing wand or beater into the mixing cup 116 to agitate the contents.

Figure 8:
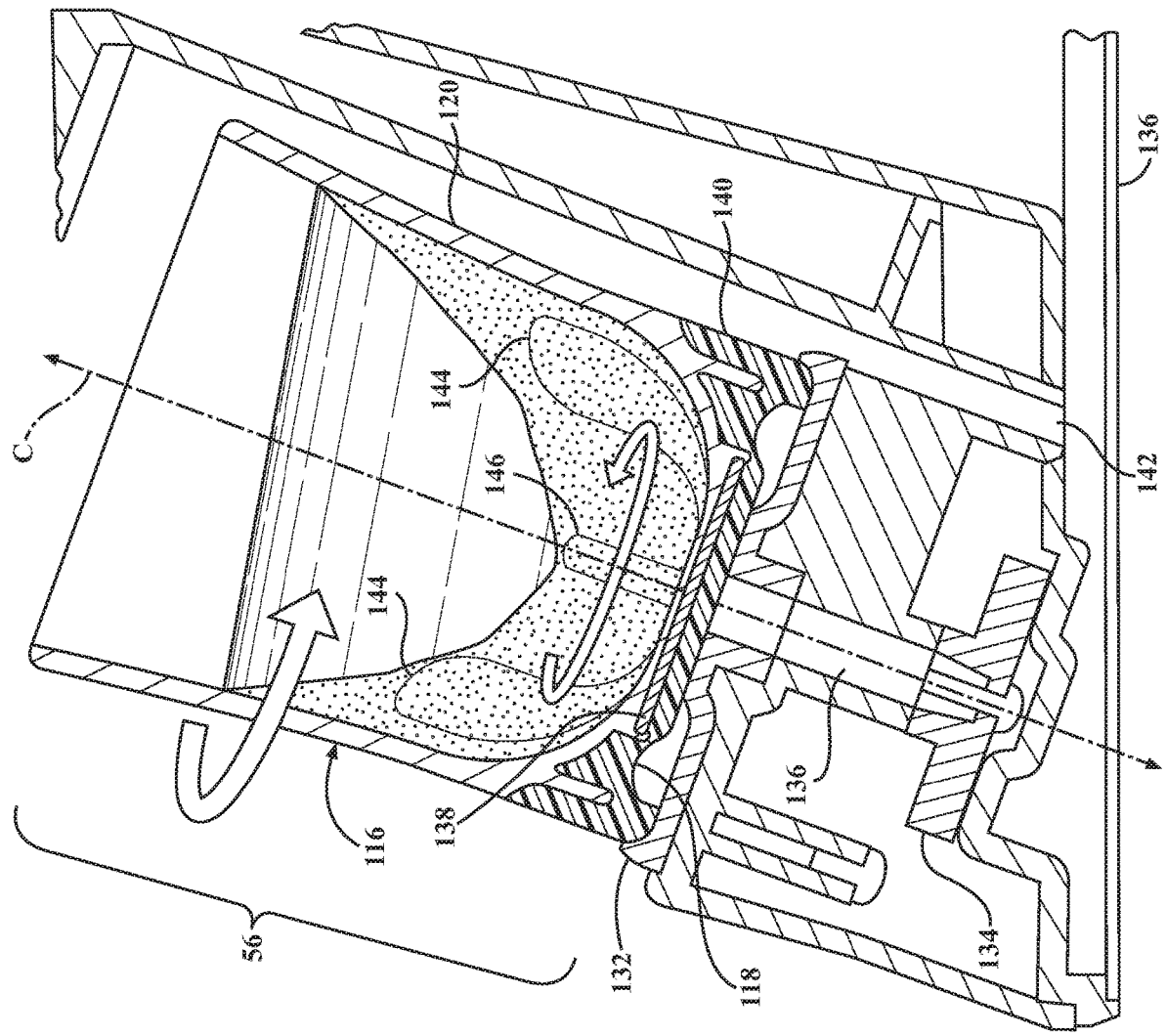
FIG. 8 is an enlarged view in cross-section showing the mixing cup disposed on a rearwardly inclined rotary platen for rotation so as to mix the granulated nutritional supplements and water into a drinkable slurry.

In the illustrated examples, the dispensing machine 30 is provided with a cup drive system that is disposed in, or otherwise associated with, the cup bay 56 of the housing 32. The cup drive system is configured to support the mixing cup and also to mix the water and nutritional supplements S in the mixing cup 116 by either moderately high speed rotation in one continuous direction, or back-and-forth rotation as depicted in FIG. 8. The cup drive system is perhaps best shown in FIGS. 7-9 including a rotary platen 132 upon which the mixing cup 116 is normally seated. The rotary platen 132 is supported in suitable bearing or bushings for rotation about a mixing axis C. The cup drive system includes a mixing motor 134 (FIG. 2). The mixing motor 134 is operatively connected to the rotary platen 132 through a central shaft 136 that lies along the mixing axis C. The rotary platen 132 may be inclined relative to horizontal, so that its mixing axis C generally intersects the drive axis A at a skewed, i.e., non-perpendicular, angle. That is, in one embodiment the rotary platen 132 is inclined backwardly into the cup bay 56, away from the user, to protect the user from collateral spillage during a rotary mix cycle. The backward tilt thus imparted to the mixing cup 116 better positions the mixing cup 116 to receive a stream of water from the exit end 126 of the conduit 124. Furthermore, the angled rotational configuration of the mixing cup 116 enhances the process of mixing water and powdered nutritional supplements S into solution, as will be elaborated on further below.

In order to hold the mixing cup 116 securely in position on the rotary platen 132 during mixing, the base 118 of the mixing cup 116 may be fitted with a first magnetic coupling 138. As one option, the first magnetic coupling 138 may comprise a ferrous plate. A rubberized surface treatment 140 can be applied as a covering over at least a portion of the sides 120 and the base 118 of the mixing cup 116. The rubberized surface treatment 140 encapsulates the ferrous plate, thus protecting it from oxidation. The rotary platen 132 includes a second magnetic coupling configured to attract the first magnetic coupling 138 in the base 118 of the mixing cup 116. The second magnetic coupling is shown in the figures as being integrated into the material composition of the rotary platen 132. That is, the material body of the rotary platen 132 is fabricated from a suitably magnetic substance. A drain hole 142 is formed in the cup bay 56 to direct any accidentally spilled liquids underneath the housing 32 and away from the mixing motor 134.

Figure 9:
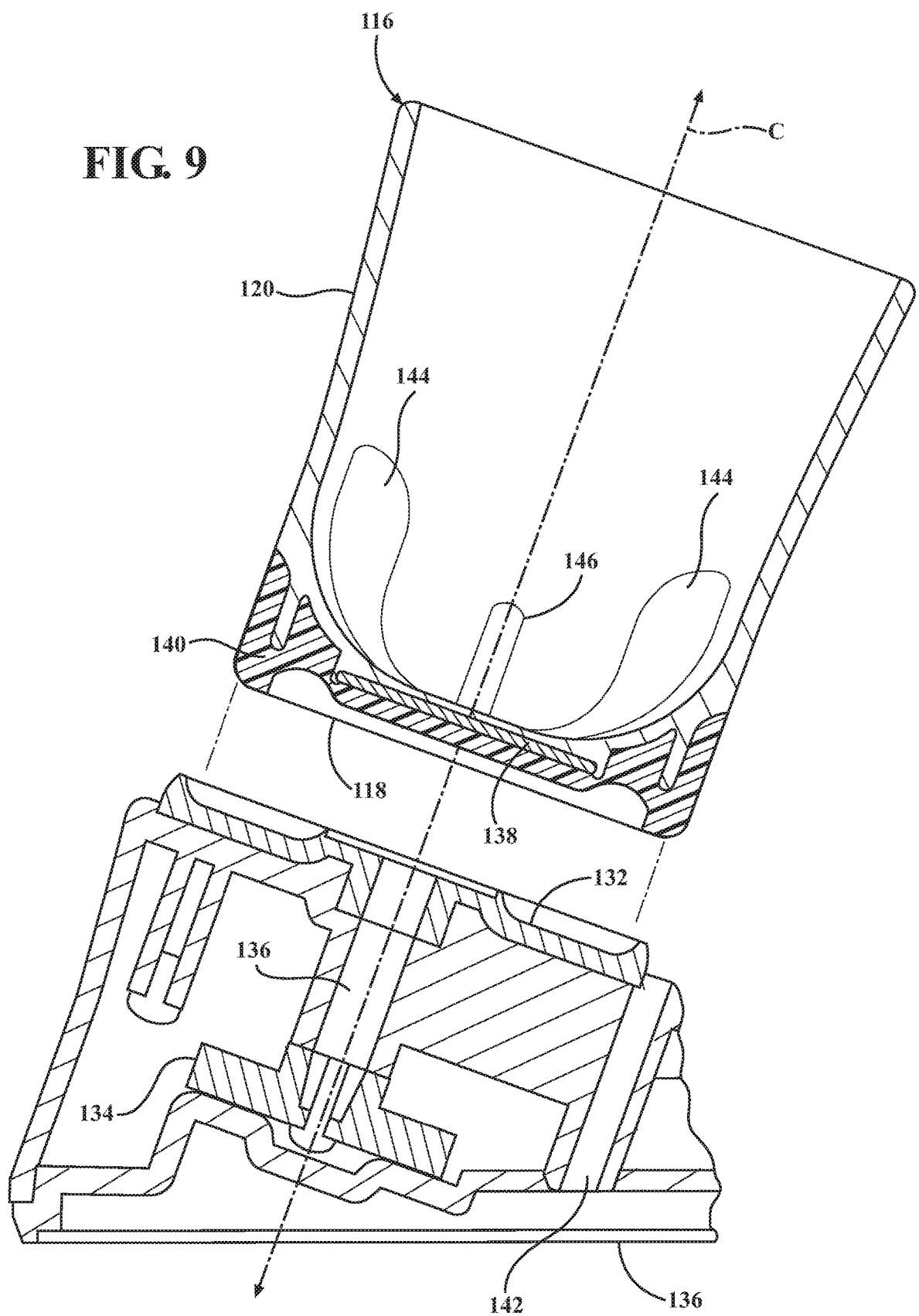
FIG. 9 is another cross-sectional view of the mixing cup and the rotary platen feature illustrating an optional magnetic coupling feature interactive therebetween.

A user can easily decouple the mixing cup 116 from the rotary platen 132 by lifting with sufficient force to overcome the magnetic attraction, as shown in FIG. 9. To further enhance the desired secure hold of the mixing cup 116 on the rotary platen 132, the base 118 of the mixing cup 116 can be designed with a particular formed shape, and the rotary platen 132 designed with a negatively formed shape that generally compliments the formed shape of the mixing cup 116 base. These conforming shapes, therefore, enable a snug nested relationship between the bottom of the mixing cup 116 and the rotary platen 132. Of course, there are many other ways to establish a secure placement of the mixing cup on the rotary platen 132 during mixing, including for example some type of clip arrangement that mechanically (rather than magnetically) locks the base 118 to the rotary platen 132.

The mixing action can be optionally enhanced by including at least one, and preferably several agitator elements inside the mixing cup 116. The agitator can of course take many forms, but in the illustrated example of FIGS. 8 and 9 comprise a plurality of paddles 144, 146 disposed in the interior region of the mixing cup 116. The paddles are here shown comprising a pair of tall paddle 144 and a pair of short paddles 146. These paddles 144, 146 act somewhat like a cement mixer as the mixing cup 116 turns to fold the contained liquid slurry over upon itself over and over again. The substantial turbulence thus created will rapidly homogenize the dry granulated nutritional supplements S and the water together into a drinkable concoction.

The previously referenced computer control system may be integrated into, or otherwise operatively associated with, a circuit board 148 as depicted in FIGS. 2 and 7. The computer control system includes a non-transitory computer readable medium coded with instructions and executed by a processor to perform the steps and other automated functions of this invention. The graphic display screen may be incorporated directly into the circuit board 148, or otherwise electrically connected. Similarly, the several motors and controlled devices in the system are electrically connected in some way through the computer control system. That is to say, the computer control system operatively interconnects the mixing motor 134 and the flow control valve 128 and the buttress 112 and the vibrator unit 114 and the solenoid motor 108 and the cartridge motor 94 and the graphic user interface 54 so that all function in the manners described herein. Furthermore, the dispensing machine 30 may further include at least one selector button 150 that is operatively connected to the computer control system. The selector button 150 can be integrated with, or surrounded by, or at least proximally associated with, an indicator light 152 that is also operatively connected to the computer control system. The indicator light 152 cooperates with the display screen 54 to inform the user of the operating status and condition of the dispensing machine 30 as will be described presently.

FIGS. 16-23A graphically describe one set of exemplary operating protocols for the dispensing machine 30. Beginning with FIG. 16, a Power On step 1601 is activated by a user depressing the selector button 150. This activates the computer control system, which initially queries whether a Process Error Flag was set in a previous operating instance and stored in the computer readable medium, at decision juncture 1602. If "no", i.e., there is no electronically stored record of a Process Error Flag having been previously set, then the display screen 54 may present an image like that shown for example in FIG. 16A. In this image, a graphical representation of the supplements cartridge 64 is shown on the display 54, and the indicator light 152 is energized to flash in a blue color, for example, to indicate that the supplements cartridge 64, i.e., "disk," is in the process of being read by the first 100 and second 102 optical sensors. The system queries whether the supplements cartridge 64 is "valid" at decision juncture 1603. If the disk (i.e., supplements cartridge 64) is recognized by the system as valid, various information details about the sensed condition and nature of the supplements cartridge 64 will be displayed on the display screen 54, such as type (e.g., vitamin or energy), number and location of unopened serving chambers 84, etc. The process continues from connector 1604 to FIG. 17. Before proceeding to FIG. 17, however, it is noteworthy to mention certain other steps in the process that appear also in FIG. 16. Returning to decision juncture 1602, if the system detects a record of a Process Error Flag having been previously set, then the display screen 54 may present an image like that shown for example in FIG. 16D. The indicator light 152 (i.e., "halo") is energized to flash in a red color, while various important messages appear on the screen 54. Optional LED lights disposed inside the cartridge chamber 46 may be made to flash. The user is instructed via these messages to remove the supplements cartridge 64, which requires the loading door 44 (i.e., lid) to be opened whereupon the system executes a Lid Open Process 1605 described more fully in FIG. 18. Before proceeding to FIG. 18, however, it is noteworthy to mention certain other steps in the process that appear also in FIG. 16. Returning to decision juncture 1603, the Valid Disk query, if the supplements cartridge 64 is not recognized by the system as valid, a Disk Present query will be initiated at decision block 1606. If, via the optical sensors 100, 102 the computer control system determines that a supplements cartridge 64 is not present, then the display screen 54 may present an image like that shown for example in FIG. 16B which graphically reinforces the absence of a supplements cartridge in the cartridge bay 46. The indicator light 152 (i.e., "halo") is energized to emit a steady red color, which requires the loading door 44 to be opened whereupon the system executes a Lid Open Process 1605 described in FIG. 18. On the other hand, if the computer control system determines that a supplements cartridge 64 is present, then the display screen 54 may present an image like that shown for example in FIG. 16C which graphically instruct the user that there is an error and the supplements cartridge 64 needs to be removed from the cartridge bay 46. Optional LED lights disposed inside the cartridge chamber 46 may be made to flash. The indicator light 152 flashes red, the loading door 44 is then required to be opened whereupon the system executes a Lid Open Process 1605 described in FIG. 18.

Figure 17:
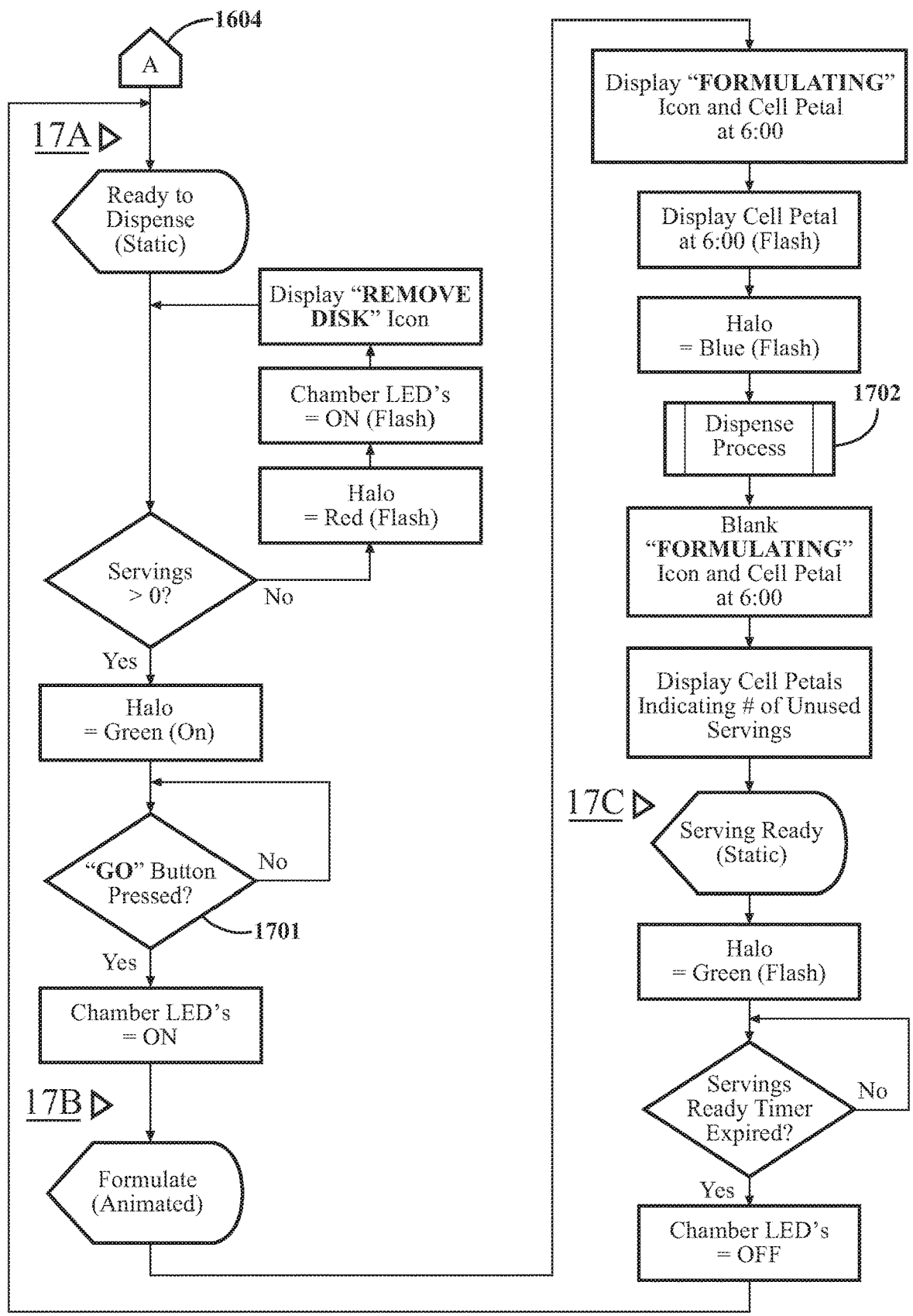
FIG. 17 is a continuation of the simplified flow diagram of FIG. 16 extending therefrom at the common pentagonal indicator.
Figure 17A:
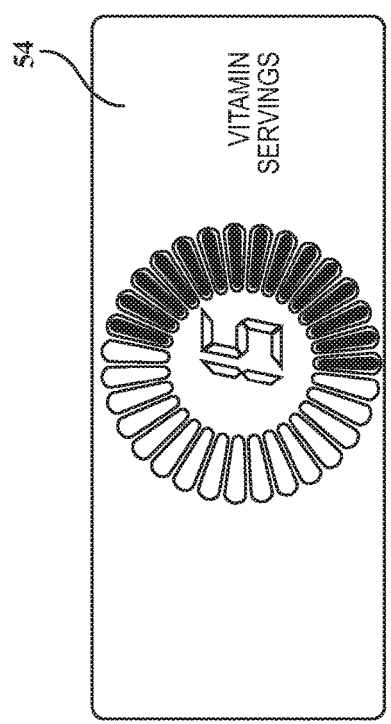
FIG. 17A is a view of the information display screen/user interface as it might appears at location 17A in the flow diagram of FIG. 17.
Figure 17C:
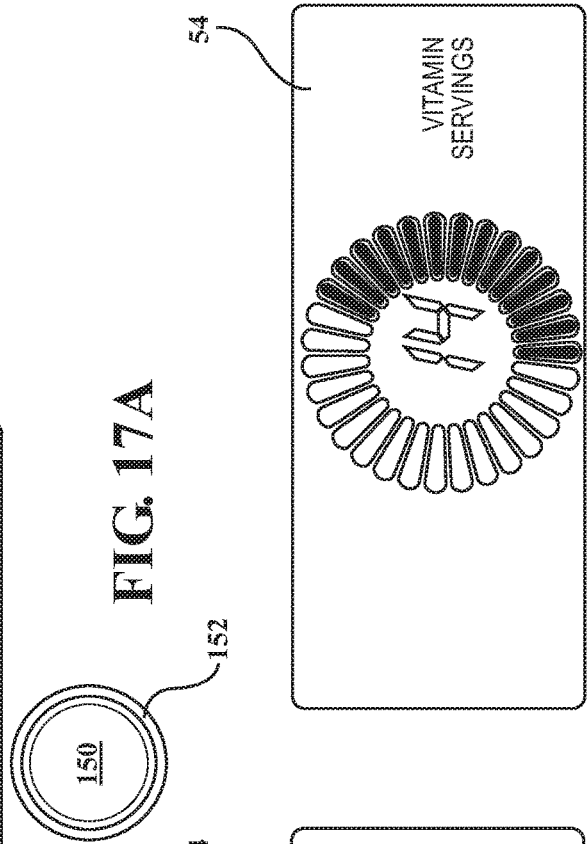
FIG. 17C is a view of the information display screen/user interface as it might appears at location 17C in the flow diagram of FIG. 17.
Figure 17B:
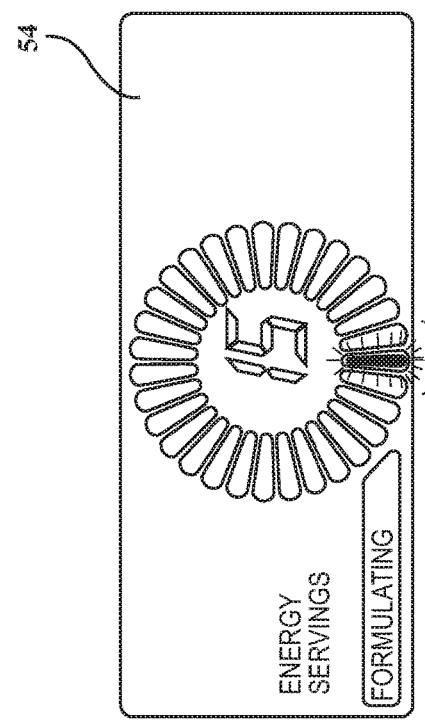
FIG. 17B is a view of the information display screen/user interface as it might appears at location 17B in the flow diagram of FIG. 17.
Figure 19:
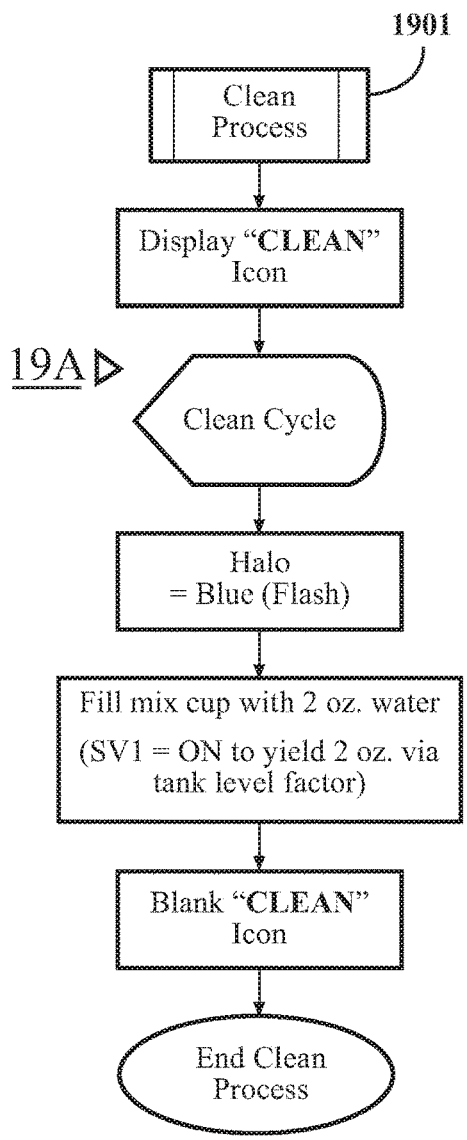
FIG. 19 is a simplified flow diagram describing a "Clean Process" sub-routine prompted by a self-diagnostic exercise according to one exemplary embodiment.

FIG. 17 is a continuation of the exemplary operating protocols for the dispensing machine 30, extending from the mutual (pentagonal) connector 1604, which is only reached after a supplements cartridge 64 has been confirmed valid and its relevant attributes "read" by the optical sensors 100, 102. During this reading stage, optional LED lights disposed inside the cartridge chamber 46 may be made to flash, adding an interesting visual effect to the user experience. At this stage, the display screen 54 may present an image like that shown for example in FIG. 17A, where the number and location of available serving chambers 84 are distinguished from the previously opened serving chambers 84 (if any). The indicator light 152 lights green, signaling the user that the dispensing machine 30 is ready to mix a dose of nutritional supplements S with water in the mixing cup 116. When the user is ready, they depress the selector button 150 at step 1701, whereupon the optional LED lights in the cartridge chamber 46 may be made to steady illuminate. The display screen 54 may change to present an image showing that the lead serving chamber 84 is in the process of formulating, like that shown in FIG. 17B. The indicator light 152 flashes blue, and the system proceed to a Dispensing Process subroutine 1702 which is described below in connection with FIG. 21. Before proceeding to the Dispensing Process subroutine and FIG. 21, however, it is noteworthy to mention certain other steps in the process that follow the Dispensing Process subroutine as shown in FIG. 17. The display screen 54 may change, as in FIG. 17C, to present an image showing there is now one less serving chamber 84 available (i.e., remaining unopened) and that the supplements cartridge 64 has been indexed so that a new lead serving chamber is ready to be formulated. The system thus re-sets itself to the process stage just after the (pentagonal) connector 1604, capable of repeated use the next time the user wants to formulate another serving.

Figure 16:
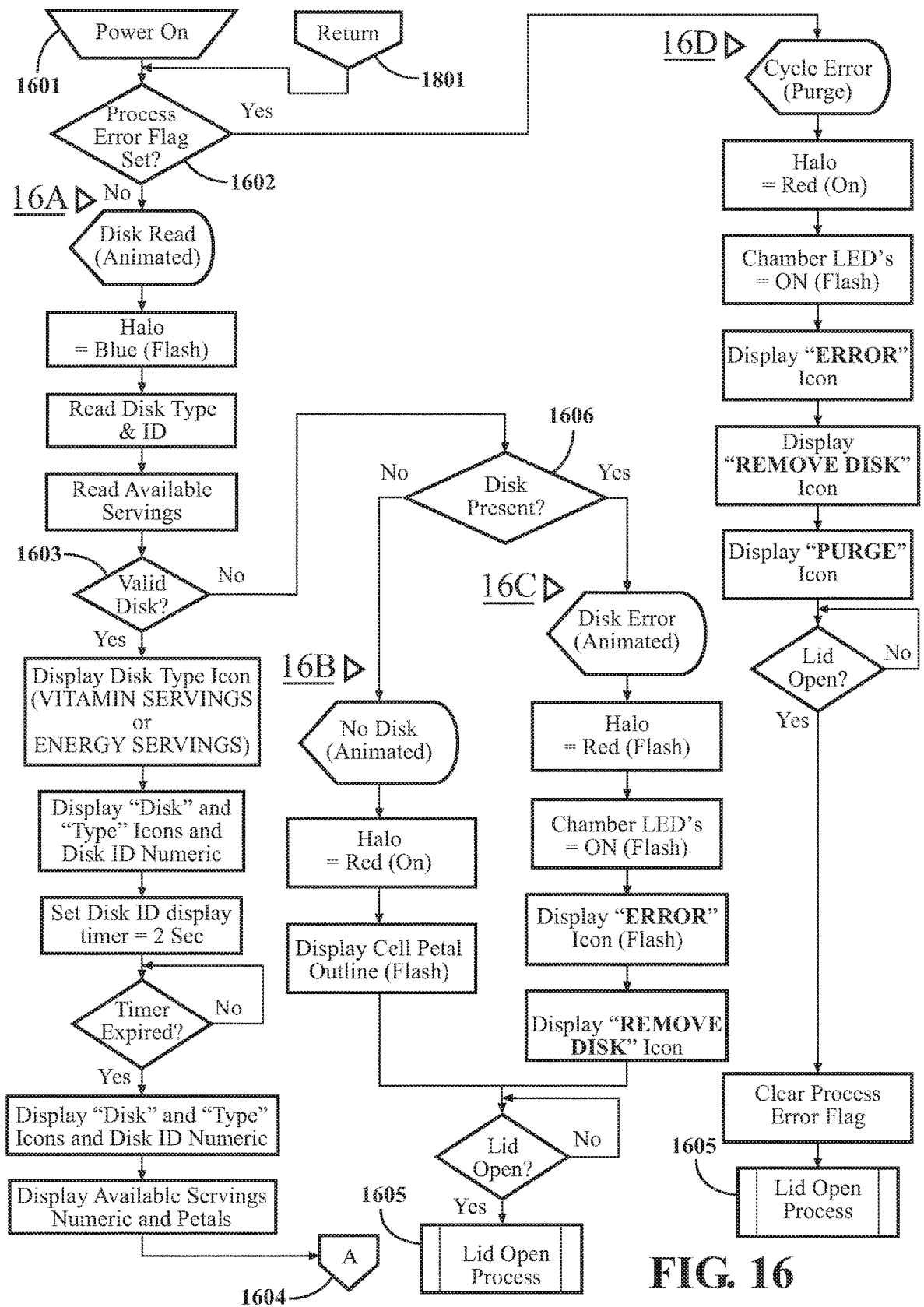
FIG. 16 is a simplified flow diagram describing the operational method of the invention according to one exemplary embodiment.
Figure 20:
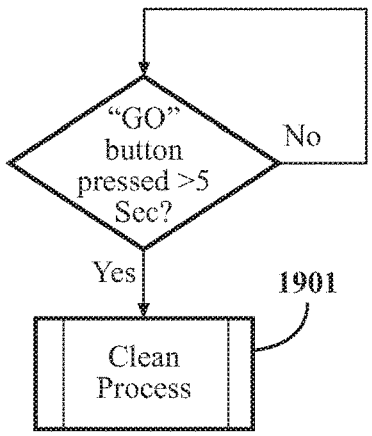
FIG. 20 is a simplified flow diagram describing a "Clean Process" sub-routine prompted by the user according to one exemplary embodiment.
Figure 19A:
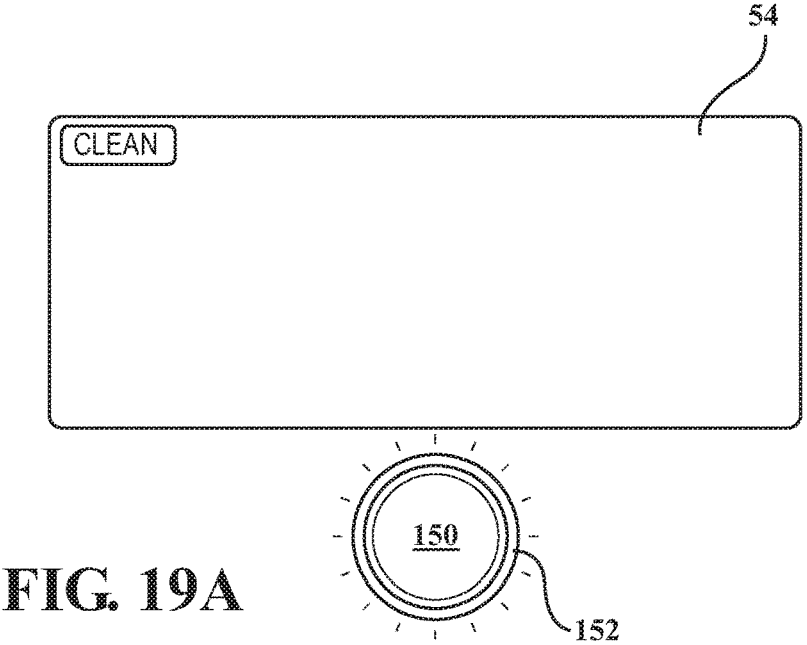
FIG. 19A is a view of the information display screen/user interface as it might appears at location 19A in the flow diagram of FIG. 19.

FIG. 18 shows the Lid Open subroutine 1605 as appears twice in FIG. 16. The Lid Open process 1605 is executed whenever the loading door 44 is opened. All processes are stopped save the optional LED chamber lights are turned steady on. The display screen 54 may present an image like that shown in FIG. 18A. After the loading door 44 is closed, the indicator light 152 turns steady blue, the LED chamber lights are turned off, and the Lid Open process 1605 terminates with a Return action as shown at action block 1801. The Return action block 1801 returns to the main system process immediately following Power On 1601 as shown in FIG. 16. [0089] FIGS. 19 and 20 describe an optional self-clearing process that the dispensing machine 30 can be made to execute. The Clean Process routine 1901 fills the mixing cup 116 with a set quantity of water, suggested here as two ounces. The display screen 54 may present an image like that shown in FIG. 19A during this step, while the indicator light 152 flashes blue. As shown in FIG. 20, the Clean Process 1901 is activated by pressing and holding the selector button 150 in excess of a set period of time, suggested here as five seconds.

Figure 21:
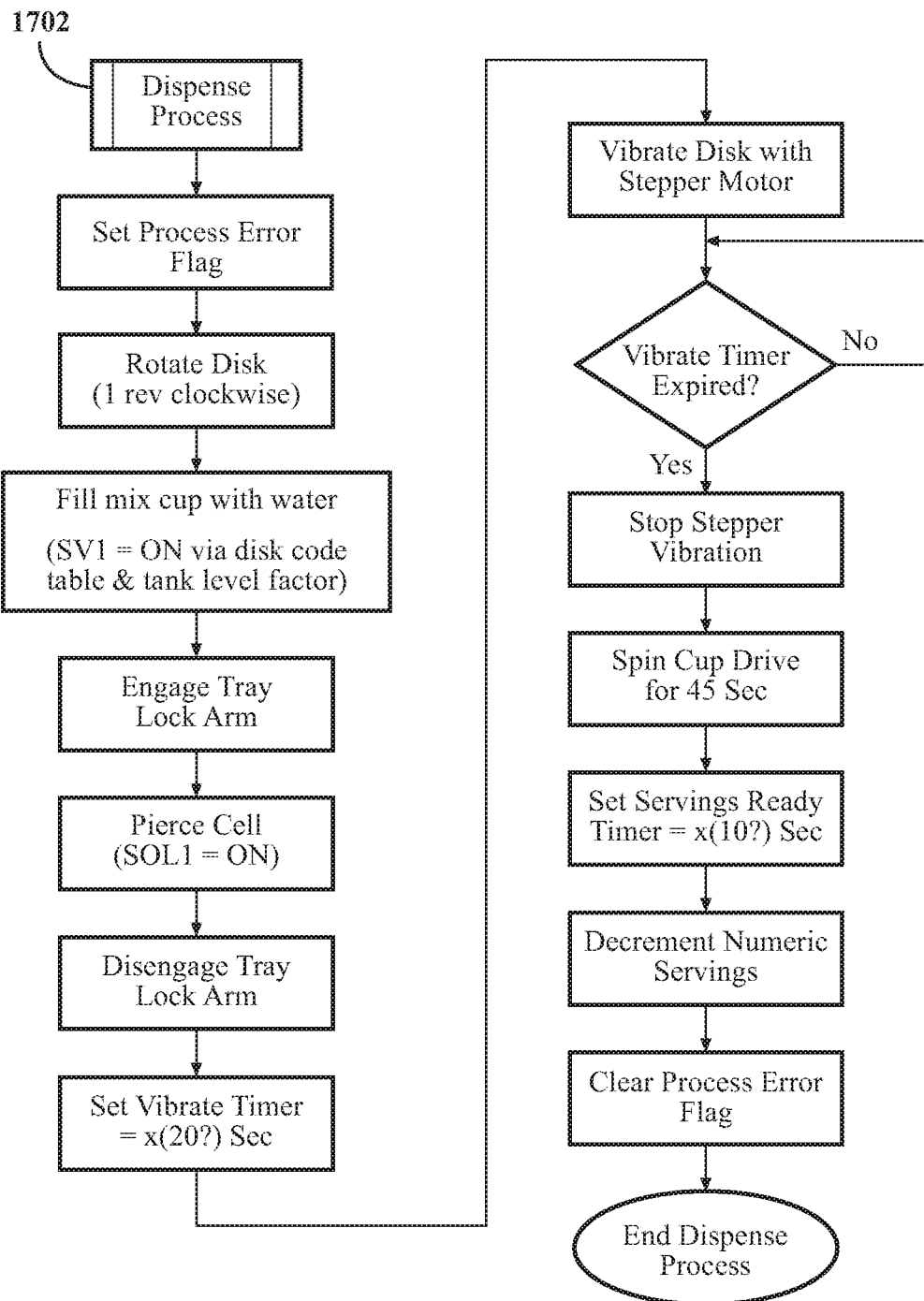
FIG. 21 is a simplified flow diagram describing a "Dispense Process" sub-routine according to one exemplary embodiment.

The Dispense Process 1702 is described in FIG. 21. As mentioned above in connection with FIG. 17, the Dispense Process 1702 is part of the formulating sequence. At the commencement of this stage, the supplements cartridge 64 is indexed so that a lead serving chamber 84 is in position for extraction, the buttress 112 (i.e., tray lock arm) is set, and then the supplements extraction mechanism 104 is actuated to pierce the membrane 88 covering both the lead serving chamber 84 and its associated marker zone 86. FIG. 21 next suggests a vibrating process slightly different than that described above in connection with the vibrator unit 114. Rather, in FIG. 21, the stepper motor of the cartridge drive mechanism 94 is rapidly actuated in a back-and-forth manner with the buttress 112 disengaged. Of course, there are many alternative ways to encourage full drainage of the nutritional supplements S from the lead serving chamber 84, with those described representing but a few of the possibilities. The Dispense Process 1702 is terminated after the computer control system decrements the number of remaining available serving chambers 84.

Figure 22:
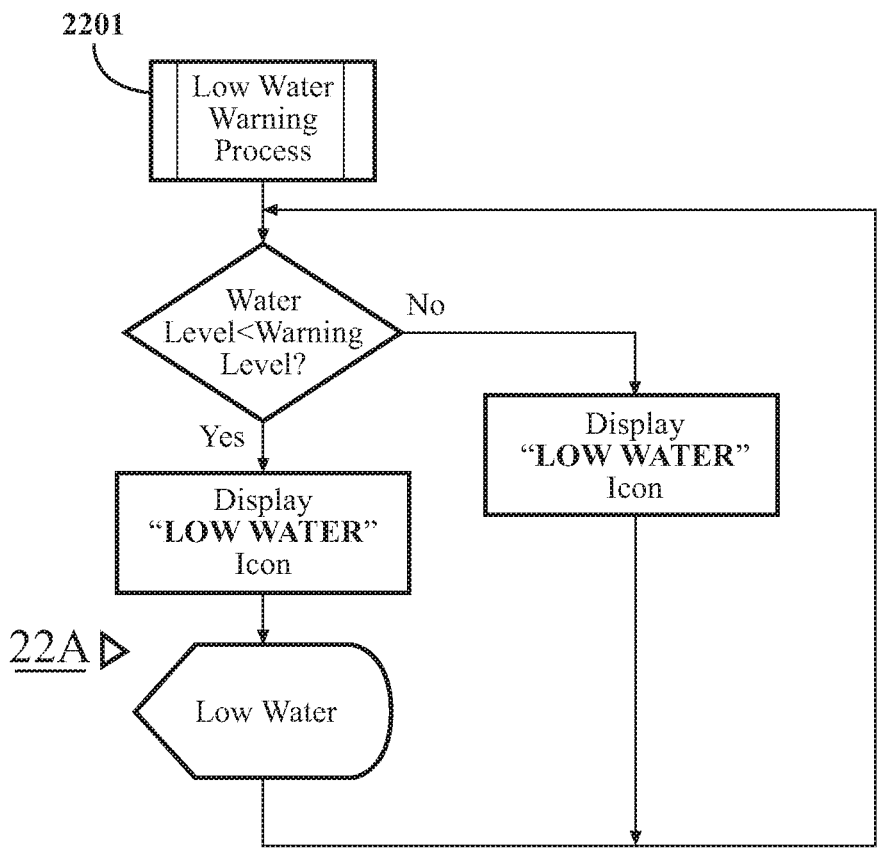
FIG. 22 is a simplified flow diagram describing a "Low Water Warning Process" subroutine according to one exemplary embodiment.
Figure 22A:
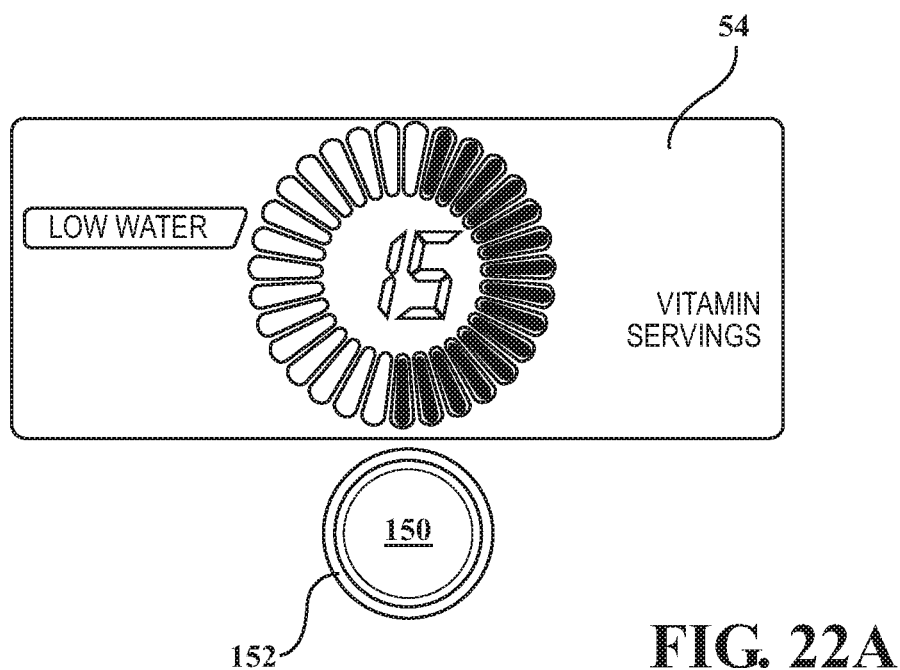
FIG. 22A is a view of the information display screen/user interface as it might appears at location 22A in the flow diagram of FIG. 22.
Figures 23, 23A:
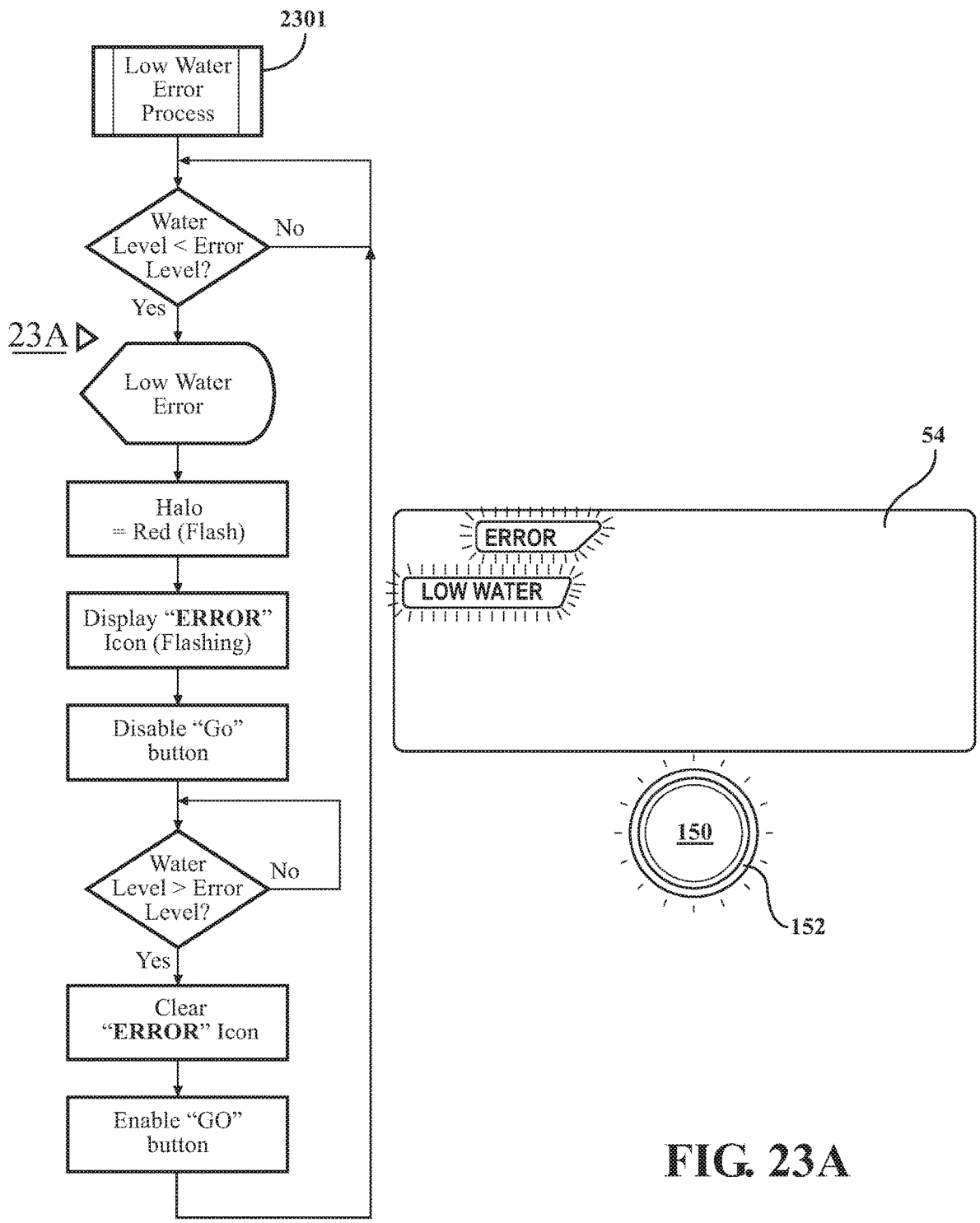
FIG. 23 is a simplified flow diagram describing a "Low Water Error Process" subroutine according to one exemplary embodiment.
FIG. 23A is a view of the information display screen/user interface as it might appears at location 23A in the flow diagram of FIG. 23.

FIG. 22 is a Low Water Warning Process routine 2201 that is activated when the fluid level monitor 130 indicates the water level 52 in the water tank 50 is below a preset threshold. The display screen 54 may present an LOW WATER message like that shown in FIG. 22A until the fluid level monitor 130 ceases to indicate that the water level 52 is below the preset threshold. If the water level 52 in the water tank 50 falls dangerously lower than the preset threshold for the Low Water Warning Process routine 2201, a Low Water Error Process routine 2301 will be activated as shown in FIG. 23. During the Low Water Error Process 2301, the selector button 150 (i.e., "Go" button) is disabled, and the display screen 54 may present both an ERROR and LOW WATER messages, while the indicator light 152 flashes red, like that shown in FIG. 23A. Once the fluid level monitor 130 ceases to indicate that the water level 52 is below the preset threshold needed to activate the Low Water Error Process 2301, the selector button 150 is reenabled for use.

To summarize, the method for dispensing nutritional supplements S may comprise the steps of: storing a quantity of water in a water tank 50 in a dispensing machine, the quantity of water in the water tank 50 having an upper exposed surface establishing a water level, inserting a supplements cartridge 64 into a cartridge bay 46 in the dispensing machine, the supplements cartridge 64 having a plurality of sealed serving chambers 84 arranged in an outermost annular region 72, storing a generally equal volume and composition of granulated nutritional supplement S in each serving chamber 84, supporting the supplements cartridge 64 in the cartridge bay 46 for rotation about a drive axis A, fixing the drive axis A at a forward-tilting angle relative to horizontal, and rotating the supplements cartridge 64 in the cartridge bay 46 about the drive axis A. The rotating step includes initially surveying the supplements cartridge 64 to determine at least one of the number and location of previously unopened serving chambers 84 in the plurality of serving chambers 84. The initially surveying step includes optically scanning for previously punctured marker cavities with a first optical sensor 100 having a first sensor field of view configured to image an intermediate annular region 76 of the supplements cartridge 64, and optically scanning a binary code with a second optical sensor 102 having a second sensor field of view configured to image an innermost annular region 74 of the supplements cartridge 64. The method further includes displaying at least one of the number and location of the previously unopened serving chambers 84 on a display screen 54. The rotating step includes initially surveying the supplements cartridge 64 to determine the compositional nature of the granulated nutritional supplements S. Displaying the compositional nature of the granulated nutritional supplements S on the display screen. Indexing the supplements cartridge 64 so that an unopened serving chamber 84 is located at a lead one of the serving chambers 84, the lead one of the serving chambers 84 comprising the lowest elevation serving chamber 84. The indexing step includes selecting an unopened serving chamber 84 that is directly adjacent to a previously opened serving chamber 84 to be the lead serving chamber 84. The indexing step includes energizing a stepper motor. Positioning a mixing cup 116 under the lead serving chamber 84, the positioning step includes supporting the mixing cup 116 on a rotary platen 132, tilting the rotary platen 132 so that the mixing up is inclined to the rear, magnetically attaching the mixing cup 116 to the rotary platen 132. Transferring the granulated nutritional supplements S from the lead serving chamber 84 into the mixing cup 116 below, the transferring step includes breaching a membrane 88 covering the lead serving chamber 84 with a lance 106, and buttressing (with a buttress 112) the lead serving chamber 84. The transferring step includes vibrating the lead serving chamber 84, and puncturing the membrane 88 covering a lead marker cavity with a spur 110. Draining a controlled quantity of water from the water tank 50 into the mixing cup 116, the draining step includes manipulating a flow control valve between open and closed positions, the manipulating step includes adjusting the time duration between open and closed positions of the flow control valve in direct response to the water level in the water tank 50. And agitating the combined water and granulated nutritional supplements S in the mixing cup 116, the agitating step includes rotating the mixing cup 116, the agitating step includes inter-folding the water and granulated nutritional supplements S with at least one paddle inside the mixing cup 116.

Figure 14:
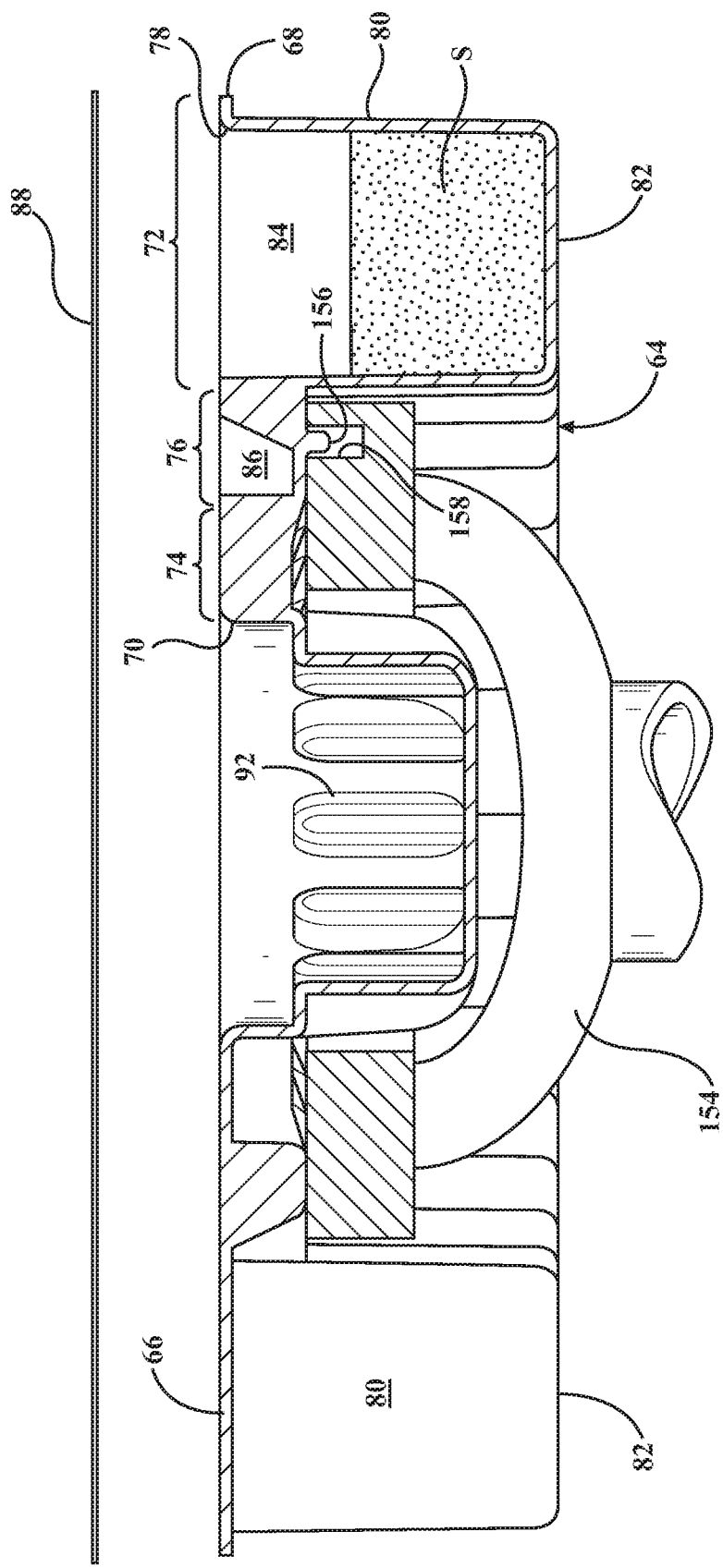
FIG. 14 is an exploded, cross-sectional view of a supplements cartridge disposed in a filling station in which the membrane is aligned so that a starter queue indicia (visible in FIGS. 12 and 13) can be properly aligned to one of the serving chambers.

As previously mentioned, the starter queue indicia must be properly aligned to one of the serving chambers 84 so that a brand new supplements cartridge 64 can be oriented in the dispensing machine 30 with a lead serving chamber 84 lined up properly with the lance 106 and spur 110. The starter queue indicia is, preferably, imprinted on the membrane 88. Therefore, when affixing the membrane 88 to the frame 66, care must be taken to position the membrane 88 so that its state queue indicia aligns with a select one of the serving chambers 84. FIG. 14 offers an exemplary method and apparatus for aligning the membrane 88 to the frame 66. Here, a supplements cartridge 64 is shown in cross-section with its membrane 88 separated as in an exploded view. The supplements cartridge 64 is disposed in a filling station 154, which is shown in one very simplified exemplary form as a supporting device upon with the back-side of the marker cavities rest. The supplements cartridge 64 is provided with a small, nib-like locator alignment pin 156 extending axially from a rearward face of the marker cavity that is associated with the serving cartridge 84 to be designed as the lead by the starter queue indicia. The filling station 154 has a corresponding member, shown here in the form of a socket 158 designed to register with or seat the alignment pin 156. In this way, the supplements cartridge 64 is easily polarized with respect to the filling station 154.

The filling station 154 can be used as a convenient platform to load nutritional supplements S into the serving chambers 84, such as with the aid of a manifold delivery system fed by a hopper containing bulk nutritional supplements S (not shown). After the serving chambers 84 are filled with the desired quantities of nutritional supplements S, the membrane 88 is affixed to the frame 66 by the aforementioned adhesive or other suitable means. Before attaching the membrane 88, it will have been pre-printed with the starter queue indicia. The membrane 88 is placed in position on the frame 66 mindful of the lead serving chamber orientation, which is reliably identifiable because the supplements cartridge 64 has been consistently oriented with respect to the filling station 154 vis the alignment pin 156 and socket 158 features. The filling process can be either manual or automated. When manual, it may be helpful to include a visual aide or indicator on the membrane to help the assembly worker properly align the membrane 88 relative to the filling station 154. When automated, a supply of preprinted membranes 88 will be loaded into a dispenser at exactly the correct orientation relative to the filling station 154 so that each is applied in the correct manner.

A method for filling a multi-chambered supplements cartridge 64 with a quantity of granulated nutritional supplements S may be stated as follows. A generally annual supplements cartridge 64 is provided having a central axis B. The supplements cartridge 64 includes a plurality of sealed serving chambers 84 arranged in an annular array about the central axis B. Each serving chamber 84 has a radial centerline that intersects the central axis B. A locator feature is formed into the supplements cartridge 64 in relation to the respective centerline of one of the serving chambers 84. The forming step includes forming an alignment pin 156. The supplements cartridge 64 is loaded in a filling station 154. The loading step includes registering the locator feature of the supplements cartridge 64 with a corresponding member of the filling station 154. The registering step includes seating the alignment pin 156 in a socket 158. Each serving chamber 84 is then filled with a generally equal volume and composition of granulated nutritional supplement S, which may be a vitamin, mineral, fiber, fatty acid, protein, amino acid, herbal medicine, bodybuilding supplement, pharmaceutical, or any other substance that is ingested for health purposes. A punctureable membrane 88 covers the supplements cartridge 64. The membrane 88 has an interior hole 70 that is aligned with an interior hole 70 in the supplements cartridge 64. A binary code indicia 90 is printed on or otherwise associated with the membrane 88. The step of printing a binary code indicia 90 includes orienting the binary code indicia 90 in an annular pattern in an innermost annular region 74 of the membrane 88. At least one starter queue indicia is fixed on the membrane 88. The step of fixing at least one starter queue indicia includes orienting the starter queue indicia within the innermost annular region 74 of the membrane 88, or alternatively on some other region of the membrane 88 or supplements cartridge 64. The serving chambers 84 are covered with the membrane 88. The covering step includes adhesively attaching the membrane 88 to the supplements cartridge 64, and further includes aligning the starter queue indicia relative to the alignment pin 156.

The present invention provides a machine and methods for dispensing nutritional supplements S (as broadly defined herein), and also multi-serving cartridges 64 therefor that will mix into solution powder-form dietary supplements in measured doses with water to be consumed by drinking. The invention enables users to supplement their dietary needs or take medicinal substances in an easy to use and efficient manner with the high quality and pure form active ingredients. The health maintenance regimen enabled by this invention will enable all uses includes children, elderly and those having difficulties in taking pills and tablets to realize the added benefits of a dietary supplement and/or to more easily ingest therapeutic substances. The disclosed system is also suitable for use in providing dietary supplements and/or pharmaceuticals for pets.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A supplement dispensing machine, the machine comprising:
   a housing having a cartridge bay shaped to receive a generally annular cartridge for rotation about a central axis, the generally annular cartridge centered about the central axis and including a plurality of serving chambers containing a volume of supplement;
   a supplement extraction mechanism associated with the cartridge bay, the supplement extraction mechanism having a first motor connected to an extraction member, the extraction member movable from a first retracted position and a second extended position to open the serving chambers one-at-a-time and empty the supplement therefrom;
   a cartridge drive mechanism having a second motor for rotating the cartridge about the central axis within the cartridge bay; and
   a computer control system operatively connected to the cartridge drive mechanism, the computer control system including a non-transitory computer readable medium coded with instructions and executed by a processor to control the second motor to rotationally index the cartridge in the cartridge bay about the central axis until an unopened serving chamber of the plurality of serving chambers is located directly adjacent to the supplement extraction mechanism, and control the first motor to move the extraction member and open the unopened serving chamber.

2. The machine of claim 1, wherein the plurality of serving chambers of the cartridge are sealed by a membrane disposed in surface-to-surface relationship over the serving chambers; and
   wherein the extraction member is formed by a lance with a pointed tip, the tip of the lance configured to breach the membrane overlaying one of the serving chambers in the second position.

3. The machine of claim 1, further comprising a first optical sensor disposed in the housing, the first optical sensor including a first sensor field of view oriented toward the cartridge bay and radially offset from the central axis when the cartridge is disposed in the cartridge bay of the housing, the computer control system operatively connected to the first optical sensor to determine at least one of the number and location of previously unopened serving chambers in the plurality of serving chambers.

4. The machine of claim 3 wherein the cartridge includes at least one starter queue indicia spatially located relative to a select one of the serving chambers, the computer control system responsive to the starter queue indicia to control the cartridge drive mechanism to rotationally index the cartridge so that the select one of the serving chambers is located directly adjacent the extraction member of the supplement extraction mechanism upon the condition that all of the plurality of the serving chambers are unopened.

5. The machine of claim 1, wherein the second motor of the cartridge drive mechanism has a rotary output shaft extending into the cartridge bay along a drive axis, the drive axis coinciding with the central axis of the cartridge when the cartridge is disposed in the cartridge bay.

6. A supplement dispensing machine, the machine comprising:
   a housing having a cartridge bay shaped to receive a generally annular supplements cartridge for rotation about a central axis such that the supplements cartridge centered about the central axis;
   a motor supported by the housing; and
   a lance drivingly connected to the motor and positioned within the housing, the lance movable between a first retracted position and a second extended position, wherein the lance extends into the cartridge bay in the second position to open the supplements cartridge;
   wherein a buttress is disposed in the housing and positioned opposite to the lance, the buttress positioned to interface with a surface of the cartridge to support the cartridge and form a reinforcing backrest against the lance as the lance moves from the first position to the second position.

7. The machine of claim 6 wherein the lance moves within a vertical plane extending through the cartridge bay.

8. The machine of claim 6 wherein the lance has a pointed tip that extends into the cartridge bay with the lance in the second position such that the tip of the lance breaches at least one membrane overlaying a serving chamber of the supplements cartridge to open the serving chamber and release a supplement stored therein.

9. The machine of claim 8 further comprising a spur supported for movement within the housing and drivingly connected to the motor, the spur positioned adjacent to the lance, wherein the spur is configured to puncture a portion of membrane that overlays a marker zone associated with each of the serving chambers when the lance breaches the membrane.

10. The machine of claim 6 further comprising a vibrator unit supported within the housing, the vibrator unit positioned to impart mechanical vibrations to the cartridge to facilitate the supplement leaving an opened serving chamber.

11. The machine of claim 6, wherein the supplement comprises at least one of a vitamin, a mineral, a fiber, a fatty acid, a protein, an amino acid, an herbal medicine, a body-building supplement, a pharmaceutical, a therapeutic, a medicine, a drug, and a treatment.

12. The machine of claim 6, wherein the supplement comprises a granulated supplement.

13. The machine of claim 6 further comprising another motor for rotating the supplements cartridge about the central axis within the cartridge bay, the another motor including a rotary output shaft extending into the cartridge bay along a drive axis, the drive axis coinciding with the central axis of the supplements cartridge when the supplements cartridge is disposed in the cartridge bay of the housing.

14. A supplement dispensing machine, the machine comprising:
- a housing having a cartridge bay shaped to receive a generally annular supplements cartridge for rotation about a central axis such that the supplements cartridge centered about the central axis;
- a motor supported by the housing;
- a lance drivingly connected to the motor and positioned within the housing, the lance movable between a first retracted position and a second extended position, wherein the lance extends into the cartridge bay in the second position to open the supplements cartridge; and
- another motor for rotating the supplements cartridge about the central axis within the cartridge bay, the another motor including a rotary output shaft extending into the cartridge bay along a drive axis, the drive axis coinciding with the central axis of the supplements cartridge when the supplements cartridge is disposed in the cartridge bay of the housing;
- wherein the supplements cartridge has a disk-shaped frame centered about the central axis, the frame including an outer peripheral flange about an interior hole, the frame including a plurality of serving chambers, a volume of supplement disposed in each serving chamber, a punctureable membrane disposed in surface-to-surface relationship over the serving chambers, a spline cup affixed to the frame, the spline cup centered over the interior hole, the spline cup including a plurality of axially extending splines; and
- wherein the lance extends through and punctures the membrane to open a selected one of the serving chambers when moving between the first and second positions.

15. The machine of claim 14, wherein the output shaft includes a drive coupling shaped to operatively engage with the splines in the spline cup of the supplements cartridge when disposed for use in the cartridge bay, the drive coupling including an annular shelf configured to support the supplements cartridge about the interior hole of the frame when disposed for use in the cartridge bay.

* * * * *